(12) United States Patent  
Yoshihara

(10) Patent No.: US 8,139,196 B2  
(45) Date of Patent: Mar. 20, 2012

(54) LIQUID CRYSTAL DISPLAY ELEMENT, METHOD OF MANUFACTURING THE ELEMENT, AND ELECTRONIC PAPER HAVING THE ELEMENT

(75) Inventor: Toshiaki Yoshihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 489 days.

(21) Appl. No.: 12/411,663

(22) Filed: Mar. 26, 2009

(65) Prior Publication Data

US 2009/0231526 A1 Sep. 17, 2009

Related U.S. Application Data

(63) Continuation of application No. PCT/JP2006/319412, filed on Sep. 29, 2006.

(51) Int. Cl.
*G02F 1/1339* (2006.01)

(52) U.S. Cl. ......... 349/156; 349/155; 349/157; 349/185

(58) Field of Classification Search .................. 349/185, 349/155–157
See application file for complete search history.

(56) References Cited

U.S. PATENT DOCUMENTS

| | | | |
|---|---|---|---|
| 6,072,557 A * | 6/2000 | Kishimoto | 349/156 |
| 6,331,881 B1 | 12/2001 | Hatano et al. | |
| 6,339,462 B1 * | 1/2002 | Kishimoto et al. | 349/156 |
| 7,864,285 B2 * | 1/2011 | Liao et al. | 349/156 |

FOREIGN PATENT DOCUMENTS

| | | |
|---|---|---|
| JP | 58-13515 S | 1/1983 |
| JP | 7-28039 A | 1/1995 |
| JP | 8-76131 A | 3/1996 |
| JP | 10-307288 A | 11/1998 |
| JP | 2000-147527 A | 5/2000 |
| JP | 2001-305551 A | 10/2001 |
| JP | 2001-311952 A | 11/2001 |
| JP | 2002-82340 A | 3/2002 |
| JP | 2004-219948 A | 8/2004 |

OTHER PUBLICATIONS

International Search Report of PCT/JP2006/319412, mailing date Jan. 16, 2007.

* cited by examiner

*Primary Examiner* — Huyen Ngo

(74) *Attorney, Agent, or Firm* — Westerman, Hattori, Daniels & Adrian, LLP; William F. Westerman

(57) ABSTRACT

The invention relates to a liquid crystal display element, a method of manufacturing the element, and electronic paper having the element. The invention provides a liquid crystal element in which a change in a state of display attributable to an external force can be suppressed, a method of manufacturing the element, and electronic paper having the element. One blue pixel region is surrounded by four wall structures and four polymer layers without any discontinuity. The wall structures are formed on a bottom substrate and are in contact with a top substrate. The polymer layers are formed by injecting a cholesteric liquid crystal and polymeric substances (monomers or oligomers) which are materials different from both of the cholesteric liquid crystal and the wall structures between the top and bottom substrates and polymerizing the polymeric substances.

11 Claims, 14 Drawing Sheets

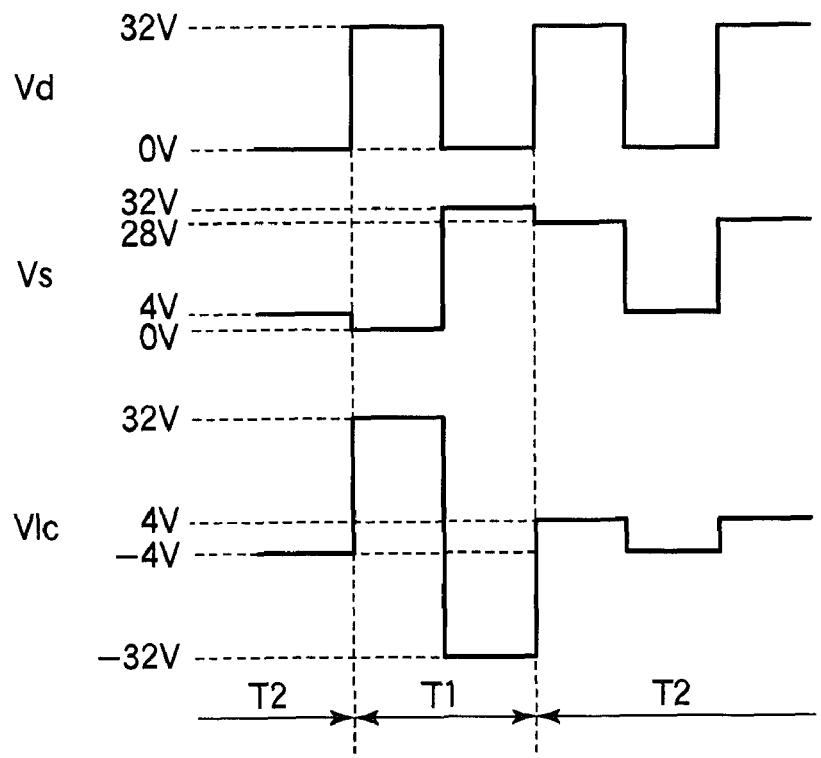
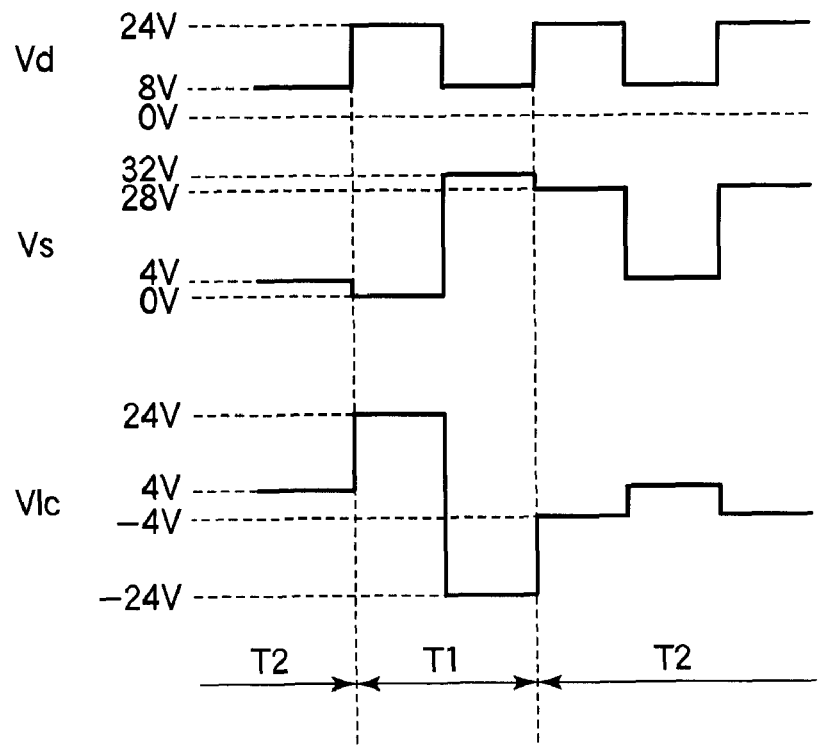

LIQUID CRYSTAL DISPLAY ELEMENT, METHOD OF MANUFACTURING THE ELEMENT, AND ELECTRONIC PAPER HAVING THE ELEMENT

This application is a continuation of International Application No. PCT/JP2006/319412, filed Sep. 29, 2006.

BACKGROUND OF THE INVENTION

1. Field of the Invention

The present invention relates to a liquid crystal display element, a method of manufacturing the element, and electronic paper having the element.

2. Description of the Related Art

Recently, various enterprises and universities are actively engaged in the development of electronic paper. The most promising field of application of electronic paper is electronic books, and other promising fields include the field of portable apparatus such as mobile terminal sub-displays and display sections of IC cards. One type of display elements used in electronic paper is liquid crystal display elements utilizing a cholesteric liquid crystal component which forms a cholesteric phase (such a component is called a cholesteric liquid crystal or chiral nematic liquid crystal and will hereinafter be referred to using the term "cholesteric liquid crystal"). A liquid crystal display element utilizing a cholesteric liquid crystal has excellent characteristics such as semi-permanent display retention characteristics (memory characteristics), vivid color display characteristics, high contrast characteristics, and high resolution characteristics.

FIG. 13 schematically depicts a sectional configuration of a liquid crystal display element 51 capable of color display utilizing a cholesteric liquid crystal. The liquid crystal display element 51 has a structure in which a blue (B) display portion 46b, a green (G) display portion 46g, and a red (R) display portion 46r are formed one over another in the order listed from the side of the element where a display surface is provided. The display surface is located on the side of the element where a top substrate 47b is provided, and external light (indicated by the arrow in a solid line) impinges on the display surface from above the substrate 47b. An eye of a viewer and the viewing direction of the viewer (represented by the arrow in a broken line) are schematically depicted above the substrate 47b.

The B display portion 46b includes a blue (B) liquid crystal layer 43b sealed between a pair of substrates, i.e., the top substrate 47b and a bottom substrate 49b and a pulse voltage source 41b for applying a predetermined pulse voltage to the B liquid crystal layer 43b. The G display portion 46g includes a green (G) liquid crystal layer 43g sealed between a pair of substrates, i.e., a top substrate 47g and a bottom substrate 49g and a pulse voltage source 41g for applying a predetermined pulse voltage to the G liquid crystal layer 43g. The R display portion 46r includes a red (R) liquid crystal layer 43r sealed between a pair of substrates, i.e., a top substrate 47r and a bottom substrate 49r and a pulse voltage source 41r for applying a predetermined pulse voltage to the R liquid crystal layer 43r. A light absorbing layer 45 is disposed on a bottom surface of the bottom substrate 49r of the R display portion 46r.

The cholesteric liquid crystal used in each of the B, G, and R liquid crystal layers 43b, 43g, and 43r is a liquid crystal mixture obtained by adding a relatively great amount of chiral additive (which is also called a chiral material) to a nematic liquid crystal until a chiral material content of several tens percent by weight is reached. When a nematic liquid crystal includes a relatively great amount of chiral material, it is possible to form a cholesteric phase that is a strong helical twist of nematic liquid crystal molecules.

A cholesteric liquid crystal has bistability (memory characteristics), and the liquid crystal can be put in any of a planar state, a focal conic state, and an intermediate state that is a mixture of the planar state and the focal conic state by adjusting the intensity of an electric field applied to the same. Once the liquid crystal enters the planar state, the focal conic state, or the mixed or intermediate state, the liquid crystal thereafter remains in the state with stability even if the electric field is removed.

The planar state can be obtained by applying a predetermined high voltage between a top substrate 47 and a bottom substrate 49 to apply an intense electric field to a liquid crystal layer 43 between the substrates and thereafter nullifying the electric field abruptly. The focal conic state can be obtained by applying a predetermined voltage lower than the above-described high voltage between the top substrate 47 and the bottom substrate 49 to apply an electric field to the liquid crystal layer 43 and thereafter nullifying the electric field abruptly.

The intermediate state that is a mixture of the planer state and the focal conic state can be obtained by, for example, applying a voltage lower than the voltage to obtain the focal conic state between the top substrate 47 and the bottom substrate 49 to apply an electric field to the liquid crystal layer 43 and thereafter nullifying the electric field abruptly.

A principle behind a display operation of the liquid crystal display element 51 utilizing a cholesteric liquid crystal will now be described referring to an example of the B display portion 46b. FIG. 14A depicts alignment of liquid crystal molecules 33 observed when the B liquid crystal layer 43b of the B display portion 46b is in the planar state. Depicted as FIG. 14A, in the planar state, the liquid crystal molecules 33 are sequentially rotated from one another in the direction of the thickness of the substrates to form a helical structure, and the helical axes of the helical structure are substantially perpendicular to the substrate surfaces.

In the planar state, light rays having wavelengths in accordance with the helical pitch of the liquid crystal molecules 33 are selectively reflected by the liquid crystal layer. A wavelength $\lambda$ which results in the maximum reflection is given by an equation $\lambda = n \cdot p$ where n and p represent the average refractive index and the helical pitch of the liquid crystal, respectively.

Therefore, in order to allow blue light to be selectively reflected by the B liquid crystal layer 43b of the B display portion 46b in the planar state, for example, the average refractive index n and the helical pitch p are determined such that an equation "$\lambda = 480$ nm" becomes true. The average refractive index n can be adjusted by selecting the liquid crystal material and the chiral material appropriately, and the helical pitch p can be adjusted by adjusting the chiral material content.

FIG. 14B depicts alignment of the liquid crystal molecules 33 observed when the B liquid crystal layer 43b of the B display portion 46b is in the focal conic state. Depicted as FIG. 14B, in the focal conic state, the liquid crystal molecules 33 are sequentially rotated from one another in an in-plane direction of the substrate surfaces to form a helical structure, and helical axes of the helical structure are substantially in parallel with the substrate surfaces. In the focal conic state, the B liquid crystal layer 43b loses the selectivity of wavelengths to be reflected, and most of light rays incident on the layer are transmitted. Since the transmitted light rays are absorbed by the light absorbing layer 45 disposed on the bottom surface of the bottom substrate 49r of the R display portion 46r, a dark state (black) can be displayed.

In the intermediate state that is a mixture of the planar and focal conic states, the ratio between reflected light and transmitted light is adjusted according to the ratio between the planar state and the focal conic state to vary the intensity of reflected light. Thus, intermediate gray levels can be displayed according to intensities of reflected light thus obtained.

As thus described, the amount of light reflected by the cholesteric liquid crystal can be controlled by using an alignment of the helically twisted liquid crystal molecules 33. The liquid crystal display element 51 capable of color display is fabricated by enclosing cholesteric liquid crystals selectively reflecting green light and red light in the planar state in the G liquid crystal layer 43g and the R liquid crystal layer 43r, respectively, in the same manner as done in the above-described B liquid crystal layer 43b. The liquid crystal display element 51 has memory characteristics, and the element can perform color display without consuming electric power except when rewriting a screen.

However, a liquid crystal display element utilizing a cholesteric liquid crystal has a problem in that a state of display memorized therein can change when an external force is applied, e.g. when a display surface of the element is pressed or bent. In the case of a TN (Twisted Nematic) or STN (Super Twisted Nematic) liquid crystal display element, the liquid crystal is normally in an electrically driven state. Therefore, even when there is a change in the state of display, the previous state of display can be immediately restored. However, in the case of a liquid crystal display element utilizing a cholesteric liquid crystal, the cholesteric liquid crystal is not driven except when a screen rewrite is performed. Therefore, once the state of display of a liquid crystal display element utilizing a cholesteric liquid crystal changes, the previous state of display cannot be restored until the liquid crystal is driven again. The most significant advantage of a liquid crystal display element utilizing a cholesteric liquid crystal is the property of memorizing a state of display. Therefore, the above-mentioned problem constitutes a significant bottleneck to be overcome to put a liquid crystal display element utilizing a cholesteric liquid crystal in practical use.

Patent Document 1: JP-A-10-307288
Patent Document 2: JP-UM-58-13515
Patent Document 3: JP-A-8-76131
Patent Document 4: JP-A-2000-147527
Patent Document 5: JP-A-2002-82340
Patent Document 6: JP-A-2004-219948

SUMMARY OF THE INVENTION

It is an object of the invention to provide a liquid crystal display element which can be prevented from undergoing a change in the state of display attributable an external force, a method of manufacturing the element, and electronic paper having the element.

The above-described object is achieved by a liquid crystal display element, characterized in that it includes a pair of substrates disposed opposite to each other, a liquid crystal sealed between the pair of substrates, a wall structure formed in contact with both of the pair of substrates, an opening section connecting regions surrounded by the wall structure, and a polymer layer formed at the opening section by polymerizing polymeric substances which are materials different from both of the liquid crystal and the wall structure.

The above-described object is also achieved by electronic paper displaying an image, characterized in that it includes the liquid crystal display element according to the invention.

The above-described object is also achieved by a method of manufacturing a liquid crystal display element, characterized in that it includes the steps of forming a wall structure and an opening section connecting regions surrounded by the wall structure on one of a pair of substrates, combining the pair of substrate such that the wall structure is put in contact with both of the pair of substrates, injecting a liquid crystal and photo-curing polymeric substances between the pair of substrates, the polymeric substances being materials which are different from both of the liquid crystal and the wall structure, exposing the opening section to polymerize the polymeric substances, and forming a polymer layer at the opening section.

The invention makes it possible to provide a liquid crystal element in which a change in a state of display attributable to an external force can be suppressed, a method of manufacturing the element, and electronic paper having the element.

BRIEF DESCRIPTION OF THE DRAWINGS

FIGS. 6A and 6B depict examples of driving waveforms of the liquid crystal display element 1 according to the embodiment of the invention;

DESCRIPTION OF THE PREFERRED EMBODIMENT

A description will now be made with reference to FIGS. 1 to 12 on a liquid crystal display element, a method of manufacturing the element, and electronic paper having the element according to an embodiment of the invention. The inventor has experimentally found out a mechanism which causes a change in a state of display of a liquid crystal display element utilizing a cholesteric liquid crystal when a display surface of the element is pressed or bent. The mechanism is explained in International Patent Application PCT/JP2004/013380 (International Publication No. WO2006/030495) previously filed by the inventor.

Such a change in a state of display occurring when the display surface is pressed or bent is attributable to a transition of the cholesteric liquid crystal from the focal conic state to the planar state. Specifically, the cause of the change is considered as follows. The liquid crystal flows within pixel regions, liquid crystal molecules are dragged on interfaces between the liquid crystal and substrates, and the liquid crystal molecules become parallel to the substrates and therefore get into a planar state. Such a change in a state of display is more significant, the smaller the cell gap of the liquid crystal display element. The reason is considered as follows. A greater amount of liquid crystal exists in the vicinity of the interfaces with substrates, the smaller the cell gap of the liquid crystal display element. The liquid crystal consequently becomes more vulnerable to the influence of the interfaces with the substrates.

Based on the findings as thus described above, the inventor has found that a change in a state of display of a liquid crystal display element attributable to a press or bend applied to the display surface of the liquid crystal display element can be prevented by forming a wall structure to suppress fluidity of the liquid crystal in pixel regions.

A description will now be made on a liquid crystal display element on which the present embodiment is premised. The inventor has proposed a liquid crystal display element in which a change in a state of display can be suppressed in International Patent Application PCT/JP2005/004925. The liquid crystal display element proposed in International Patent Application PCT/JP2005/004925 is similar to the display portions 46b, 46g, and 46r in that it has a liquid crystal layer including top and bottom substrates disposed opposite to each other and a cholesteric liquid crystal sealed between the top and bottom substrates. A plurality of data electrodes extending in parallel with each other are formed on the surface of the bottom substrate facing the top substrate. A plurality of scan electrodes are formed on the surface of the top substrate facing the bottom substrate such that they perpendicularly intersect the plurality of data electrodes when viewed in the normal direction of the substrate surfaces. The plurality of scan electrodes extend in parallel with each other.

Figure 1:
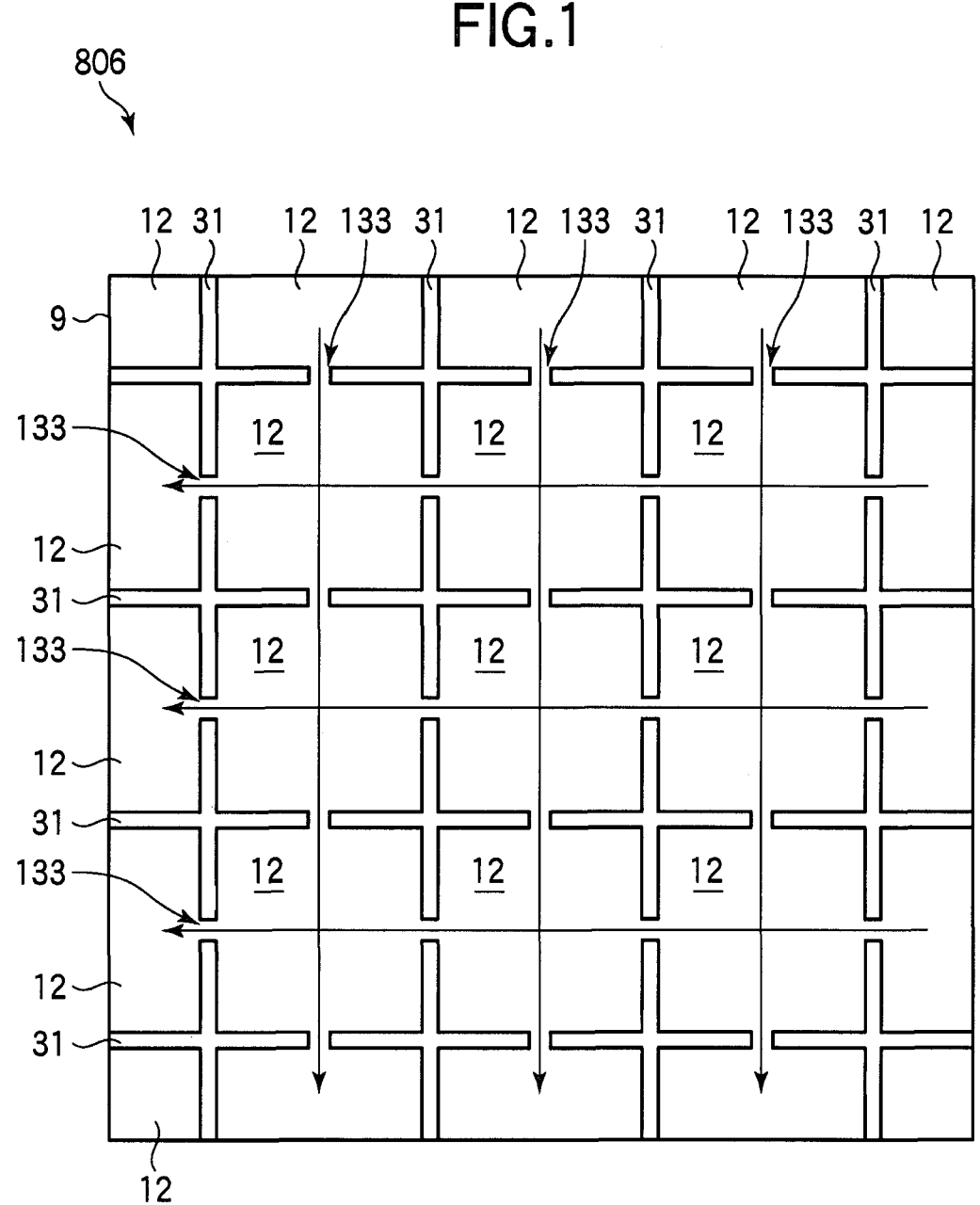
FIG. 1 is a plan view of a liquid crystal display element 806 proposed in International Patent Application PCT/JP2005/004925, depicting a configuration of the element viewed in the normal direction of substrate surfaces thereof.

FIG. 1 is a plan view of a liquid crystal display element 806 proposed in International Patent Application PCT/JP2005/004925 depicting a configuration of the element viewed in the normal direction of substrate surfaces thereof. Each of regions where scan electrodes and data electrodes intersect each other (regions where the scan electrodes and the data electrodes overlap when viewed in the normal direction of the substrate surfaces) constitutes a pixel region 12. A plurality of pixel regions 12 are disposed in the form of a matrix depicted as FIG. 1. FIG. 1 depicts nine pixel regions 12 and the neighborhood thereof.

Wall structures 31 are formed on a bottom substrate 9, and the structures are in contact with a top substrate (which is not depicted in FIG. 1). The wall structures 31 are members having adhesive properties, and they are bonded to both of the top substrate and the bottom substrate 9. Each wall structure 31 is substantially in the form of two cross bars which are substantially equal in length when viewed in the normal direction of the substrate surfaces. The wall structures 31 are formed between pixel regions 12 adjacent to each other. One pixel region 12 is surrounded by four wall structures 31. The center of a wall structure 31 is located at a corner of a pixel region 12.

An opening section 133 is formed between each pair of wall structures 31 which are adjacent to each other. One end of each wall structure 31 faces an end of an adjacent wall structure 31 across an opening section 133. An opening section 133 is formed near the center of each of four sides of a pixel region 12. One pixel region 12 is contiguous to four opening sections 133. Liquid crystal layers in each pair of pixel regions 12 adjacent to each other are connected through an opening 133. The openings 133 are formed to inject a liquid crystal in the pixel regions 12. When a cholesteric liquid crystal is injected in the liquid crystal display element 806 using, for example, the vacuum injection method, all pixel regions 12 are filled with the liquid crystal through the openings 133.

In the liquid crystal display element 806, the pixel regions 12 are laterally surrounded by the wall structures 31 except in the regions where opening sections 133 are provided, and the wall structures 31 are bonded to both of the top substrate and the bottom substrate 9. Therefore, the movement of the liquid crystal in the pixel regions 12 is limited. As a result, a change in a display state of the liquid crystal display element 806 can be suppressed even when the display surface of the liquid crystal display element 806 is pressed or bent. That is, a memorized state of display (a state of image display at zero power consumption) has improved resistance to a press or bend applied to the display surface.

However, some movement of the liquid crystal still remains in the liquid crystal display element 806, and a change in a state of display can therefore occur when there is an external force attributable to a strong press or bend. The cause of such movement will now be described with reference to FIG. 1. In the liquid crystal display element 806, an opening section 133 is formed at each of four sides of a pixel region 12 to inject the liquid crystal into the pixel region 12. Therefore, as schematically indicated by arrows in FIG. 1, liquid crystal channels are formed through a plurality of opening sections 133 to extend across a plurality of pixel regions 12 in row and column directions. The channels extend inside the pixel regions 12. Therefore, the liquid crystal in the pixel regions 12 can still move around in the liquid crystal display element 806 when an external force attributable to a press or bend is applied.

Patent Document 1 discloses a liquid crystal element including a pair of substrates with electrodes, at least either of which is transparent and a composite film held between the substrates. The composite film includes resin walls and a liquid crystal exhibiting a cholesteric phase, and pixels are formed by the electrodes. Each part of the composite film corresponding to one pixel has a plurality of regions which are different from each other in one of resin wall attributes, i.e., the density, pitch, and shape of the resin walls or different in two or more of the attributes.

The resin walls are formed by manufacturing steps as described below. First, a gap between the substrates is filled with a mixed liquid obtained by mixing a liquid crystal which exhibits a cholesteric phase at room temperature, a monomer or oligomer which is a precursor of a photo-curing resin (e.g., a precursor of a UV-curing resin), and a polymerization initiator at a predetermined ratio. Then, a photo-mask having a predetermined pattern is disposed outside the transparent substrate, and the mixed liquid is irradiated with light having a predetermined illuminance (e.g., ultraviolet light) through the photo-mask at a temperature equal to or higher than a clearing point of the liquid crystal exhibiting a cholesteric phase (a temperature at which the liquid crystal enters an isotropic phase). As a result, the resin monomer or oligomer is cured in locations irradiated with the light, and the liquid crystal and the resin are phase-separated to form resin walls corresponding to the shape of the mask.

The purpose of forming resin walls in the liquid crystal element disclosed in Patent Document 1 is to display multiple gray levels by forming a plurality of regions in one pixel, the regions being different from each other in one of resin wall attributes, i.e., the density, pitch, and shape of the resin walls or different in two or more of the attributes. However, the liquid crystal element disclosed in Patent Document 1 requires a high liquid crystal driving voltage because the liquid crystal is added with a great amount of photo-curing resin to form resin walls. Therefore, the liquid crystal element disclosed in Patent Document 1 has a problem in that general-purpose driver ICs cannot be used. The element has another problem in that the resin walls have low strength and are therefore insufficient in resistance to a press.

The liquid crystal display element 806 may alternatively be provided using a method as described below. The wall structures 31 are formed also in the locations of the openings 133 such that the pixel regions 12 are laterally surrounded on four sides thereof without discontinuity, and the liquid crystal is injected at the same time when the substrates are combined. According to this method, since the pixel regions 12 are completely surrounded by the wall structures 31 on four sides thereof, no liquid crystal channel extending across a plurality of pixel regions 12 is formed. Since the movement of the liquid crystal attributable to a press or bend is therefore more effectively suppressed, a change in a state of display can be more effectively suppressed.

According to this method, however, a special process such as an ink jet process is used for injecting a liquid crystal. According to this method, it is very much difficult to control the amount of a liquid crystal injected. The method therefore has a problem in that it is very much difficult to seal a liquid crystal in the liquid crystal display element 806. A difficulty is also encountered in bonding the top substrate and the wall structures 31 at the step of combining the substrates because a liquid crystal exists between the top substrate (which may be also referred to as "opposite substrate") and the wall structures 31. The problem of contamination can also arise because the wall structures are put in contact with a liquid crystal when they are uncured.

A liquid crystal display element according to the present embodiment is more effective than the liquid crystal display element 806 in suppressing a change in a state of display attributable to an external force. The liquid crystal of the liquid crystal display element of the present embodiment can be easily injected, and the element is highly resistant to a press or bend.

Figure 2:
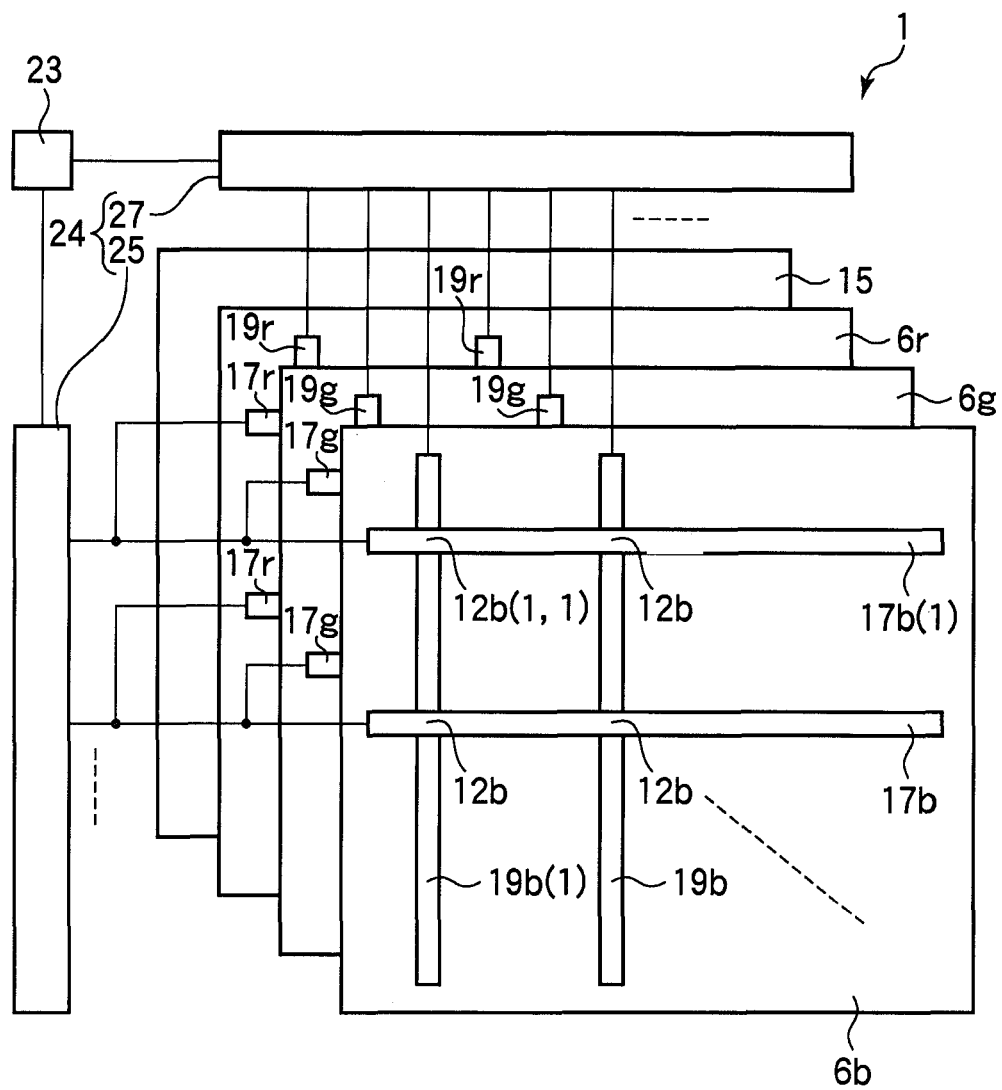
FIG. 2 is an illustration depicting a schematic configuration of a liquid crystal display element 1 according to an embodiment of the invention.
Figure 3:
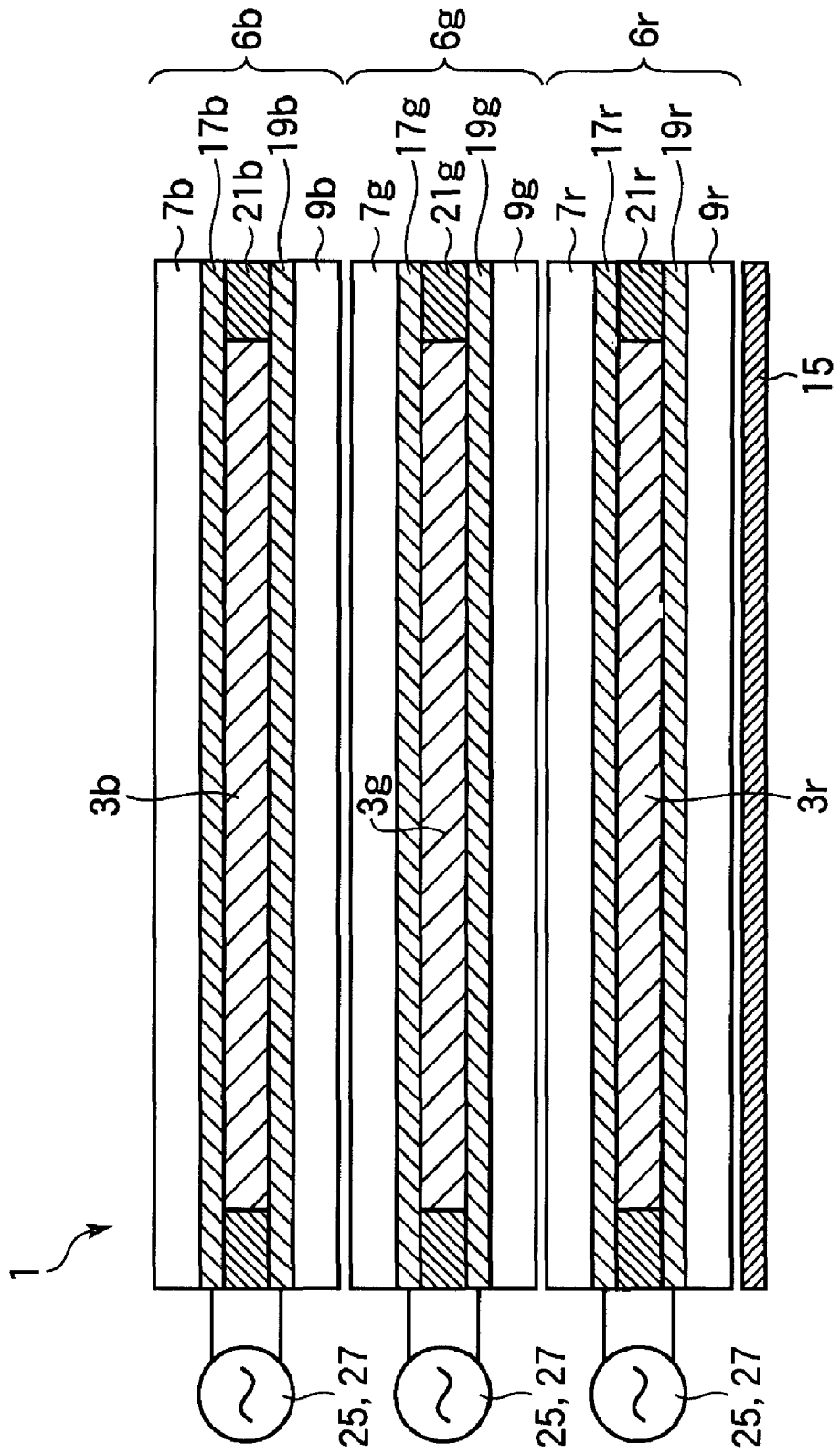
FIG. 3 is an illustration schematically depicting a sectional configuration of the liquid crystal display element 1 according to the embodiment of the invention.

A liquid crystal display element according to the present embodiment will now be described with reference to FIGS. 2 to 5. As an example of a liquid crystal display element according to the present embodiment, a liquid crystal display element 1 utilizing cholesteric liquid crystals for blue (B), green (G), and red (R) will be described. FIG. 2 depicts an example of a schematic configuration of the liquid crystal display element 1 according to the present embodiment. FIG. 3 schematically depicts a sectional configuration of the liquid crystal display element 1 taken along a straight line in parallel with the horizontal direction of FIG. 2.

Depicted as FIGS. 2 and 3, the liquid crystal display element 1 includes a B display portion (first display portion) 6b having a B liquid crystal layer 3b reflecting blue light in the planar state, a G display portion (second display portion) 6g having a G liquid crystal layer 3g reflecting green light in the planar state, and an R display portion (third display portion) 6r having an R liquid crystal layer 3r reflecting red light in the planar state. The B, G, and R display portions 6b, 6g, and 6r are formed in the order listed that is the order of their closeness to a light entrance surface (display surface).

The B display portion 6b includes a pair of substrates, i.e., a top substrate 7b and a bottom substrate 9b disposed opposite to each other and the B liquid crystal layer 3b which is sealed between the substrates 7b and 9b. The B liquid crystal layer 3b includes a B for blue cholesteric liquid crystal having an average refractive index n and a helical pitch p adjusted such that blue light will be selectively reflected.

The G display portion 6g includes a pair of substrates, i.e., a top substrate 7g and a bottom substrate 9g disposed opposite to each other and the G liquid crystal layer 3g which is sealed between the substrates 7g and 9g. The G liquid crystal layer 3g includes a G for green cholesteric liquid crystal having an average refractive index n and a helical pitch p adjusted such that green light will be selectively reflected.

The R display portion 6r includes a pair of substrates, i.e., a top substrate 7r and a bottom substrate 9r disposed opposite to each other and the R liquid crystal layer 3r which is sealed between the substrates 7r and 9r. The R liquid crystal layer 3r includes an R for red cholesteric liquid crystal having an average refractive index n and a helical pitch p adjusted such that red light will be selectively reflected.

The liquid crystal composition forming each of the B, G, and R liquid crystal layers 3b, 3g, and 3r is a cholesteric liquid crystal obtained by adding a chiral material to a nematic liquid crystal composition up to 10 to 40% by weight. The chiral material content is a value expressed on an assumption that the amounts of the nematic liquid crystal component and the chiral material total at 100% by weight. While various types of known nematic liquid crystals may be used, materials satisfying an expression "$20 \leq \Delta\epsilon \leq 50$" are preferably used to keep driving voltages for the liquid crystal layers 3b, 3g, and 3r relatively low where $\Delta\epsilon$ represents dielectric constant anisotropy. The cholesteric liquid crystals preferable have refractive index anisotropy $\Delta n$ satisfying an expression "$0.18 \leq \Delta n \leq 0.24$". The liquid crystal layers 3b, 3g, and 3r have low reflectances in the planar state when the refractive index anisotropy $\Delta n$ is lower than the range. On the contrary, when the refractive index anisotropy $\Delta n$ is higher than the range, the liquid crystal layers 3b, 3g, and 3r have significant scattered reflections in the focal conic state and have high viscosity which results in a reduction in response speed.

The chiral materials added to the B and R cholesteric liquid crystals are optical isomers having optical rotatory power different from that of the chiral material added to the G cholesteric liquid crystal. Thus, the B and R cholesteric liquid crystals are the same as each other and different from the G cholesteric liquid crystal in terms of optical rotatory power.

Figure 4:
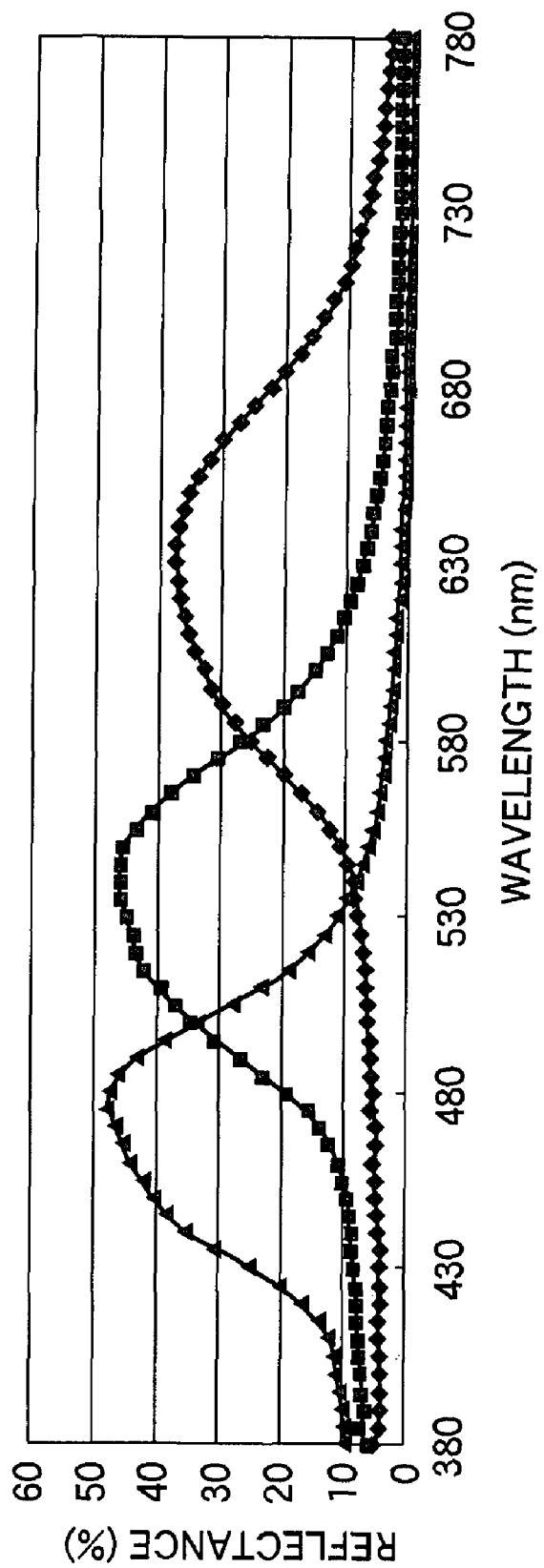
FIG. 4 is a graph depicting examples of reflection spectra of the liquid crystal display element in a planar state.

FIG. 4 depicts examples of reflection spectra of the liquid crystal layers 3b, 3g, and 3r in the planar state. The abscissa axis represents wavelengths (nm) of reflected light, and the ordinate axis represents reflectances (in percentages in comparison to that of a white plate). The curve connecting the black triangular symbols in the figure represents a reflection spectrum observed at the B liquid crystal layer 3b. Similarly, the curve connecting the black square symbols in the figure represents a reflection spectrum observed at the G liquid crystal layer 3g, and the curve connecting the black rhombic symbols in the figure represents a reflection spectrum observed at the R liquid crystal layer 3r.

Depicted as FIG. 4, center wavelengths of the reflection spectra of the liquid crystal layers 3b, 3g, and 3r in the planar state have magnitudes ascending in the order in which the layers are listed. In the multi-layer structure formed by the B, G, and R display portions 6b, 6g, and 6r, the optical rotatory power of the G liquid crystal layer 3g is different from the optical rotatory power of the B liquid crystal layer 3b and the R liquid crystal layer 3r in the planar state. Therefore, in the region where the blue and green reflection spectra overlap and the region where the green and red reflection spectra overlap as depicted in FIG. 4, for example, right-handed circularly polarized rays of light can be reflected by the B liquid crystal layer 3b and the R liquid crystal layer 3r, and left-handed circularly polarized rays of light can be reflected by the G liquid crystal layer 3g. Thus, light incident on the element can be efficiently reflected, and the liquid crystal display element 1 can therefore be provided with a display surface having improved brightness.

In the present embodiment, two polycarbonate (PC) film substrates cut to have longitudinal and transversal lengths of 10 (cm)×8(cm) are used as each of substrate pairs, i.e., the top substrates 7b, 7g, and 7r paired with the bottom substrates 9b, 9g, and 9r, respectively. Glass substrates or film substrates made of polyethyleneterephthalate (PET) or the like may be used instead of PC substrates. Such film substrates have sufficient flexibility. The top substrates 7b, 7g, and 7r and the bottom substrates 9b, and 9g are translucent. Although all of the top substrates 7b, 7g, and 7r and the bottom substrates 9b, 9g, and 9r used in the present embodiment are translucent, the bottom substrate 9r of the R display portion 6r disposed to constitute the lowermost layer may be opaque.

Depicted as FIGS. 2 and 3, a plurality of data electrodes 19b in the form of strips are formed in parallel on the side of the bottom substrate 9b of the B display portion 6b facing the B liquid crystal layer 3b, the electrodes extending in the vertical direction of FIG. 2. A plurality of scan electrodes 17b in the form of strips are formed in parallel on the side of the top substrate 7b of the B display portion 6b facing the B liquid crystal layer 3b, the electrodes extending in the horizontal direction of FIG. 2. Depicted as FIG. 2, the plurality of scan electrodes 17b and data electrodes 19b are disposed in a face-to-face relationship such that they intersect each other when viewed in the normal direction of the surfaces of the top substrate 7b and the bottom substrate 9b where the electrodes are formed. In the present embodiment, transparent electrodes are patterned to form 320 scan electrodes 17b and 240 data electrodes 19b in the form of stripes having a pitch of 0.24 mm to allow QVGA display of 320×240 dots. What is indicated by reference numeral 19b in FIG. 3 is the region where the plurality of data electrodes 19b are provided, and the figure does not suggest the shape of the electrodes. Each of intersections between the scan electrode 17b and a data electrode 19b (regions where the scan electrodes and the data electrodes overlap when viewed in the normal direction of the substrate surfaces) constitutes a B pixel region 12b. A plurality of B pixel regions 12b are disposed in the form of a matrix having 320 rows and 240 columns. A display screen is formed by arranging such pixel regions in the form of a matrix.

For example, a typical material used to form the scan electrodes 17b and the data electrodes 19b is an indium tin oxide (ITO). Alternative materials include transparent conductive films made of an indium zinc oxide (IZO) or the like, metal electrodes made of aluminum, silicon or the like, and photo-conductive films made of amorphous silicon or the like.

Preferably, each of the electrodes 17b and 19b is coated with a functional film such as an insulation film or an alignment film for controlling the alignment of liquid crystal molecules (neither of the films is illustrated). The insulation film has the function of preventing shoring between the electrodes 17b and 19b, and the film also serves as a gas barrier layer having the function of improving the reliability of the liquid crystal display element 1. Materials which can be used as the alignment film include organic films such as polyimide resins, polyamide resins, polyetherimide resins, polyvinyl butyral resins, and acryl resins and inorganic materials such as silicon oxides and aluminum oxides. In the present embodiment, for example, alignment films are applied throughout the substrates to coat the electrodes 17b and 19b. The alignment films may be also used as insulating thin films.

Depicted as FIG. 3, the B liquid crystal layer 3b is sealed between the substrates 7b and 9b by a seal material 21b applied to the peripheries of the top substrate 7b and the bottom substrate 9b. The B liquid crystal layer 3b has a thickness (cell gap) d which is kept uniform. In order to maintain a predetermined cell gap d, spherical spacers made of a resin or inorganic oxide are dispersed in the B liquid crystal layer 3b. Alternatively, a plurality of columnar spacers are formed in the B liquid crystal layer 3b. In the liquid crystal display element 1 of the present embodiment, spherical spacers (not depicted) are inserted in the B liquid crystal layer 3b to keep the cell gap d uniform. The cell gap d of the B liquid crystal layer 3b is preferably in the range of $3 \mu m \leq d \leq 6 \mu m$. The liquid crystal layer 3b has an undesirably low reflectance when the cell gap d is smaller than the range and requires an excessively high driving voltage when the cell gap is greater than the range.

Figure 5:
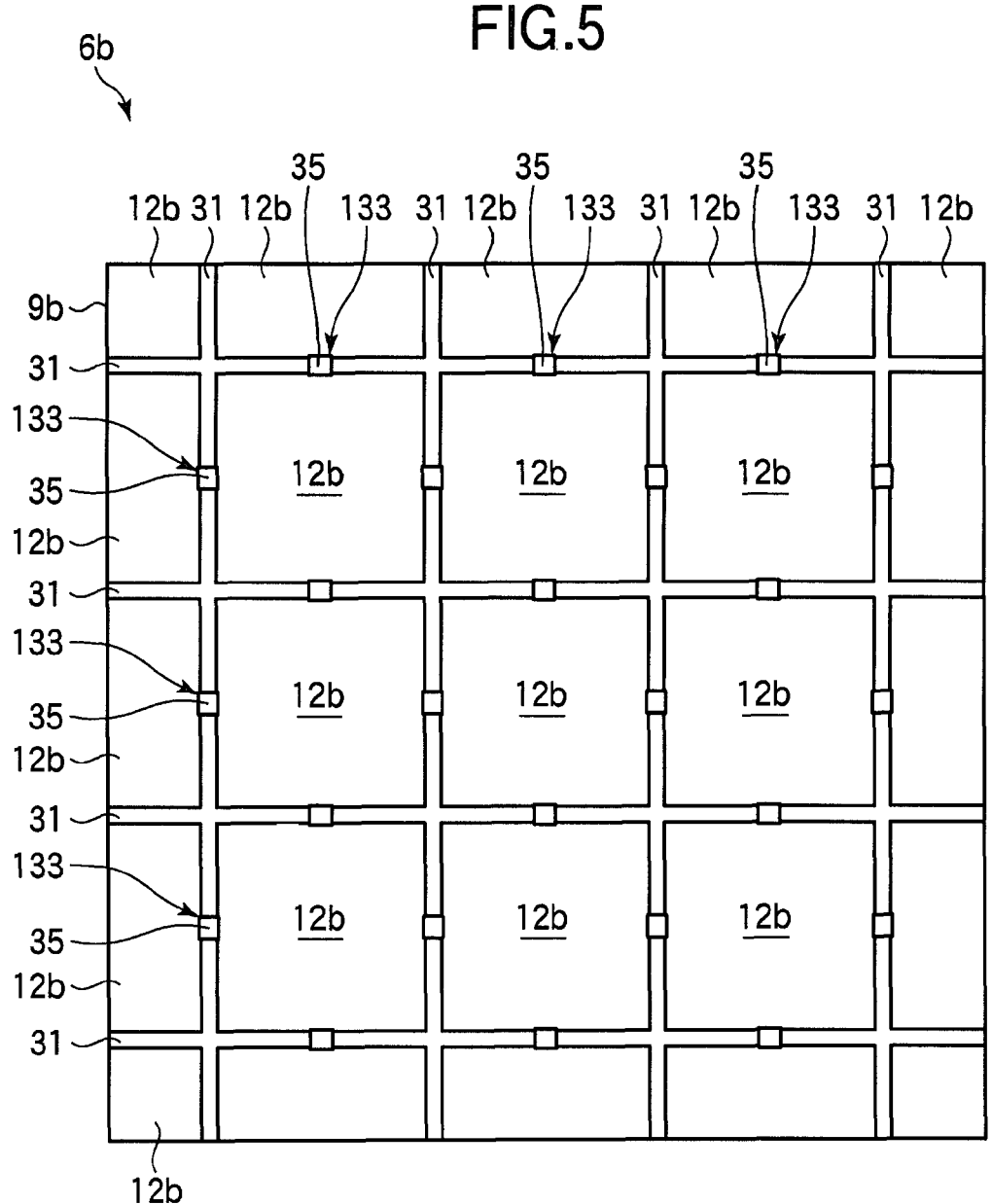
FIG. 5 depicts a configuration of a part of a display portion 6b viewed in the normal direction of substrate surfaces.

FIG. 5 depicts a configuration of a part of the B display portion 6b viewed in the normal direction of the substrate surfaces. Depicted as FIG. 5, the B display portion 6b is characterized in that it includes polymer layers 35 formed at opening sections 133 unlike the liquid crystal display element 806. FIG. 5 depicts nine B pixel regions 12b and neighborhoods of the regions.

The wall structures 31 are formed on the bottom substrate 9b and are in contact with the top substrate 7b (not depicted in FIG. 5). The wall structures 31 are members which have adhesive properties and which adhere to both of the top substrate 7b and the bottom substrate 9b. The wall structures 31 also serve as spacers for maintaining the cell gap d together with the spherical spacers. When viewed in the normal direction of the substrate surfaces, the wall structures 31 are substantially in the form of two cross bars which are substantially equal in length. The wall structures 31 are formed between B pixel regions 12b adjacent to each other. One B pixel region 12b is surrounded by four wall structures 31. The center of a wall structure 31 is located at a corner of a B pixel region 12b.

For example, the wall structures 31 are formed from a photo-resist using a photolithographic process. The wall structures 31 are formed by, for example, at steps as described below. A photo-resist is applied to the bottom substrate 9b prior to the step of combining the top substrate 7b and the bottom substrate 9b and the step of injecting the liquid crystal. Then, the photo-resist is exposed and developed to form the wall structures 31.

For example, the wall structures 31 can be provided with adhesive properties by performing post-baking of the wall structures 31 after combining the bottom substrate 9b having the wall structure formed thereon with the top substrate 7b. Thus, the wall structures 31 can be provided with adhesive properties depending on the material from which the wall structures 31 are formed.

In general, it is difficult to provide the liquid crystal display element with high rigidity and high cell gap uniformity when film substrates are used as the top substrate 7b and the bottom substrate 9b. In the present embodiment, however, since the wall structures 31 are bonded to both of the top substrate 7b and the bottom substrate 9b, the B display portion 6b has high rigidity, and the cell gap of the same has high uniformity.

In general, a liquid crystal has a thermal expansion coefficient higher than that of a wall structure. Therefore, in case that the wall structures 31 have no adhesive property, spaces are formed between the wall structures 31 and the top substrate 7b when the liquid crystal expands due to a temperature change. In such a case, the liquid crystal in the B pixel regions 12b can move to other B pixel regions 12b through the spaces. Therefore, the liquid crystal freely flow between the top substrate 7b and the bottom substrate 9b, and a significant change can consequently occur in a state of display. On the contrary, the wall structures 31 of the B display portion 6b have adhesive properties in practice, and the structures are bonded to both of the top substrate 7b and the bottom substrate 9b. Thus, the movement of the liquid crystal attributable to thermal expansion can be prevented. It is therefore possible to prevent a change in a state of display at the B display portion 6b attributable to an abrupt temperature change.

A polymer layer 35 is formed at the opening section 133 between each pair of wall structures 31 adjacent to each other. The polymer layers 35 are formed by polymerizing a polymeric substance (monomer or oligomer) which is a material different from both of the cholesteric liquid crystal and the wall structures 31. The polymeric substance is mixed with the cholesteric liquid crystal and injected into the B liquid crystal layer 3b along with the cholesteric liquid crystal. An end of a wall structure 31 faces an end of another wall structure 31 located adjacent to the same with a polymer layer 35 interposed between them. A polymer layer 35 is formed near the center of each of four sides of each B pixel region 12b. One B pixel region 12b is contiguous to four polymer layers 35. One B pixel region 12b is surrounded by four wall structures 31 and four polymer layers 35 without discontinuity. The liquid crystal layers 3b in the B pixel regions 12b include a polymer (not depicted in FIG. 5) formed by polymerizing a polymeric substance just as done to form the polymer layers 35. The polymer is formed from the same material as the polymer layers 35.

In the B display portion 6b, the B pixel regions 12b are laterally surrounded by four wall structures 31 and four polymer layers 35 without discontinuity, and the wall structures 31 are bonded to both of the top substrate 7b and the bottom substrate 9b. Therefore, the movement of the liquid crystal in the B pixel regions 12b is more effectively limited compared to that in the liquid crystal display element 806. Therefore, the element is more effective than the liquid crystal display element 806 in preventing a change in a state of display at the B display portion 6b attributable to an external force imparted to the display surface above the B display portion 6b by pressing or bending the same. Specifically, when compared to the liquid crystal display element 806, a memorized state of display can be kept with higher resistance to a press or bend.

The structure of the G display portion 6g and the R display portion 6r will not be described because it is similar to that of the B display portion 6b. Depicted as FIGS. 2 and 3, a visible light absorbing layer 15 is provided on the outer surface (bottom surface) of the bottom substrate 9r of the R display portion 6r or at the lowermost part of the element on the side of the element opposite to the display surface side. Since the visible light absorbing layer 15 is provided, rays of light which have not been reflected by the B, G, and R liquid crystal layers 3b, 3g, and 3r can be efficiently absorbed. Therefore, the liquid crystal display element 1 can display an image with a high contrast ratio. The visible light absorbing layer 15 may be provided as occasion demands.

A scan electrode driving circuit 25 carrying scan electrode driver ICs for driving the plurality of scan electrodes 17b, 17g, and 17r is connected to the top substrates 7b, 7g, and 7r. A data electrode driving circuit 27 carrying data electrode driver ICs for driving the plurality of data electrodes 19b, 19g, and 19r is connected to the bottom substrates 9b, 9g, and 9r. A driving section 24 is formed by the scan electrode driving circuit 25 and the data electrode driving circuit 27.

The scan electrode driving circuit 25 selects three predetermined scan electrodes 17b, 17g, and 17r based on a predetermined signal output from a control circuit 23 and outputs a scan signal to the selected three scan electrodes 17b, 17g, and 17r simultaneously. Based on a predetermined signal output from the control circuit 23, the data electrode driving circuit 27 outputs image data signals for the B, G, and R pixel regions 12b, 12g, and 12r on the selected scan electrodes 17b, 17g, and 17r to the respective data electrodes 19b, 19g, and 19r. For example, general-purpose STN driver ICs having a TCP (tape carrier package) structure are used as the scan electrode driver ICs and the data electrode driver Ics.

A predetermined output terminal of the scan electrode driving circuit 25 is commonly connected to predetermined input terminals of the scan electrodes 17b, 17g, and 17r. Thus, there is no need for providing a scan electrode driving circuit 25 for each of the B, G, and R display portions 6b, 6g, and 6r, and the configuration of the driving circuit of the liquid crystal display element 1 can therefore be made simple. Since the number of scan electrode driver ICs required is small, the liquid crystal display element 1 can be manufactured at a low cost. The sharing of the output terminal of the scan electrode driving circuit 25 between the B, G, and R display portions may be implemented as occasion demands.

The liquid crystal display element 1 of the present embodiment utilizes cholesteric liquid crystals as liquid crystal. Therefore, color display and memorized-image display (displaying an image at zero power consumption) can be easily achieved.

A method of driving the liquid crystal display element 1 will now be described with reference to FIGS. 6A, 6B, and 7. FIGS. 6A and 6B depict examples of driving waveforms of the liquid crystal display element 1. FIG. 6A depicts driving waveforms for putting a cholesteric liquid crystal in the planar state, and FIG. 6B depicts driving waveforms for putting the cholesteric liquid crystal in the focal conic state. In FIGS. 6A and 6B, a data signal voltage waveform Vd output from the data electrode driving circuit 27 is depicted in the top part. A scan signal voltage waveform Vs output from the scan electrode driving circuit 25 is depicted in the middle part. An applied voltage waveform Vlc applied to the liquid crystal layers 3b, 3g, and 3r in any of the pixel regions 12b, 12g, and 12r is depicted in the bottom part. In FIGS. 6A and 6B, time is depicted to lapse in the left-to-right direction of the figures, and voltages are represented in the vertical direction of the figures.

Figure 7:
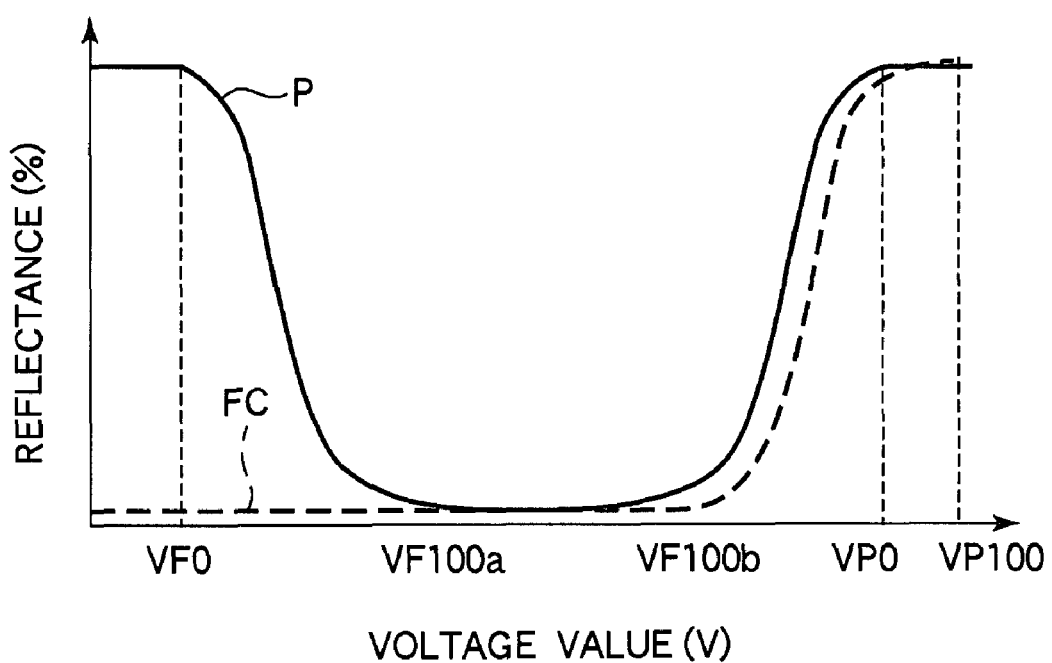
FIG. 7 is a graph depicting an example of voltage-reflectance characteristics of a cholesteric liquid crystal.

FIG. 7 depicts an example of voltage-reflectance characteristics of a cholesteric liquid crystal. The abscissa axis represents voltage values (V) applied to the cholesteric liquid crystal, and the ordinate axis represents reflectances (%) of the cholesteric liquid crystal. The curve P in a solid line depicted in FIG. 7 represents voltage-reflectance characteristics observed when the cholesteric liquid crystal is initially in the planar state, and the curve FC in a broken line represents voltage-reflectance characteristics observed when the cholesteric liquid crystal is initially in the focal conic state.

Operations of the embodiment will now be described based on an example in which predetermined voltages are applied to a blue (B) pixel region 12*b*(1,1) located at an intersection between a data electrode 19*b*(1) that is the first column of the B display portion 6*b* depicted in FIG. 2 and a scan electrode 17*b*(1) that is the first row of the display portion. Depicted as FIG. 6A, in the first half of a selection period T1 during which the scan electrode 17*b*(1) of the first row is selected, the data signal voltage Vd is +32 V, whereas the scan signal voltage Vs is 0 V. In the second half of the period, the data signal voltage Vd is 0 V, whereas the scan signal voltage Vs is +32V. Therefore, a pulse voltage of +32 V is applied to the B liquid crystal layer 3*b* at the B pixel region 12*b*(1,1) during the selection period T1. When a predetermined high voltage VP100 (which is, for example, 32 V) is applied to the cholesteric liquid crystal to generate a strong electric field therein, the helical structure of liquid crystal molecules is completely decomposed into a homeotropic state in which all liquid crystal molecules follow the direction of the electric field. Therefore, the liquid crystal molecules in the B liquid crystal layer 3*b* at the B pixel region 12*b*(1,1) are in the homeotropic state during the selection period T1.

When the selection period T1 ends and a non-selection period T2 starts, voltages of, for sample, +28 V and +4 V having a period equivalent to one half of the selection period T1 are applied to the scan electrode 17*b*(1) of the first row. On the other hand, predetermined data signal voltages Vd are applied to the data electrode 19*b*(1) of the first column. In FIG. 6A, voltages of, for sample, +32 V and 0 V having a period equivalent to one half of the selection period T1 are applied to the data electrode 19*b*(1) of the first column. Therefore, a pulse voltage of +4 V is applied to the B liquid crystal layer 3*b* at the B pixel region 12*b*(1,1) during the non-selection period T2. As a result, the electric field generated in the B liquid crystal layer 3*b* at the B pixel region 12*b*(1,1) during the non-selection period T2 is made substantially zero.

When the voltage applied to the liquid crystal changes from the voltage VP100 (±32 V) to a voltage VF0 (±4 V) to make the electric field substantially zero abruptly with the liquid crystal molecules in the homeotropic state, the liquid crystal molecules enter a helical state in which the helical axes are directed substantially perpendicular to the electrodes 17*b*(1) and 19*b*(1). Thus, the liquid crystal enters the planar state, in which rays of light in accordance with the helical pitch are selectively reflected. Since the B liquid crystal layer 3*b* at the B pixel region 12*b*(1,1) thus enters the planar state to reflect light, blue is displayed at the B pixel region 12*b*(1,1).

Depicted as FIG. 6B, in the first half of the selection period T1 and in the second half of the period, the data signal voltage Vd is 24 V and 8 V, respectively, whereas the scan signal voltage Vs is 0 V and +32 V, respectively. Then, a pulse voltage of +24 V is applied to the B liquid crystal layer 3*b* at the B pixel region 12*b*(1,1). Depicted as FIG. 7, when a predetermined low voltage VF100*b* (which is, for example, 24 V) is applied to the cholesteric liquid crystal to generate a weak electric field therein, the helical structure of the liquid crystal molecules is not completely decomposed. In the non-selection period T2, for example, voltages of +28 V and +4 V having a period equivalent to one half of the selection period T1 are applied to the scan electrode 17*b*(1) of the first row, and predetermined data signal voltages Vd (which are, for example, +24 V and +8 V) having a period equivalent to one half of the selection period T1 are applied to the data electrode 19*b*(1). Thus, a pulse voltage of +4 V is applied to the B liquid crystal layer 3*b* at the B pixel region 12*b*(1,1) during the non-selection period T2. As a result, the electric field generated in the B liquid crystal layer 3*b* at the B pixel region 12*b*(1,1) is made substantially zero during the non-selection period T2.

When the voltage applied to the cholesteric liquid crystal changes from the voltage VF100*b* (+24 V) to the voltage VF0 (+4 V) to make the electric field substantially zero abruptly in the state in which the helical structure of the liquid crystal molecules is not completely decomposed, the liquid crystal molecules enter a helical state in which their helical axes are direction in a direction substantially parallel with the electrodes 17*b*(1) and 19*b*(1), and the liquid crystal enters the focal conic state in which incident light is transmitted. Thus, the B liquid crystal layer 3*b* at the B pixel region 12*b*(1,1) enters the focal conic state to transmit light. Depicted as FIG. 7, the cholesteric liquid crystal can be also put in the focal conic state by applying the voltage VP100 (+32 V) to generate a strong electric field in the liquid crystal layer and by thereafter removing the electric field slowly.

The driving voltages and driving method described above are merely examples. When a pulse voltage of 30 to 35 V is applied between the electrodes 17(1) and 19(1) for an effective duration of 20 ms at room temperature, the cholesteric liquid crystal of the B liquid crystal layer 3*b* enters a state for selective reflection (planar state). When a pulse voltage of 15 to 22 V is applied for an effective duration of 20 ms, the cholesteric liquid crystal enters a highly transmissive state (focal conic state).

When an electric field having an intermediate intensity is applied to the cholesteric liquid crystal and is abruptly removed thereafter, the cholesteric liquid crystal enters an intermediate state that is a mixture of the planar state and the focal conic state. Thus, multi-level display can be performed.

A green (G) pixel region 12*g*(1,1) and a red (R) pixel region 12*r*(1,1) are driven in the same manner in which the B pixel region 12*b*(1,1) is driven, whereby color display can be performed at a pixel region 12(1,1) that is formed by the three pixel regions, i.e., the B, G, and R pixel regions 12*b*(1,1), 12*g*(1,1), and 12*r*(1,1) stacked one over another. The scan electrodes 17*b*(1) to 17*b*(320), 17*g*(1) to 17*g*(320), and 17*r*(1) to 17*r*(320) constituting the first to 320th rows of the respective display portions may be driven in the so-called line sequential mode (line sequentially scanned) to rewrite data voltages at the respective data electrodes 19*b*, 19*g*, and 19*r* on each row. Thus, display data are output to all of pixel regions 12(1,1) to 12(320, 240) to achieve color display of one frame (display screen).

An example of a method of manufacturing the liquid crystal display element 1 will now be described with reference to FIG. 3 and FIGS. 8 to 12B. First, a method of fabricating a B display portion 6*b* will be described. ITO transparent electrodes are first formed on two polycarbonate (PC) film substrates (top and bottom substrates) 7*b* and 9*b* which have been cut into lengths of 10 cm and 8 cm in longitudinal and transversal directions, respectively. The electrodes are etched and patterned to form electrodes in the form of stripes having a pitch of 0.24 mm (scan electrodes 17*b* and data electrodes 19*b*) on the top and bottom substrates, respectively. Thus, stripe-like electrodes 17*b* and 19*b* are formed on the two PC film substrates 7*b* and 9*b*, respectively, to allow QVGA display of 320×240 dots.

Figure 8:
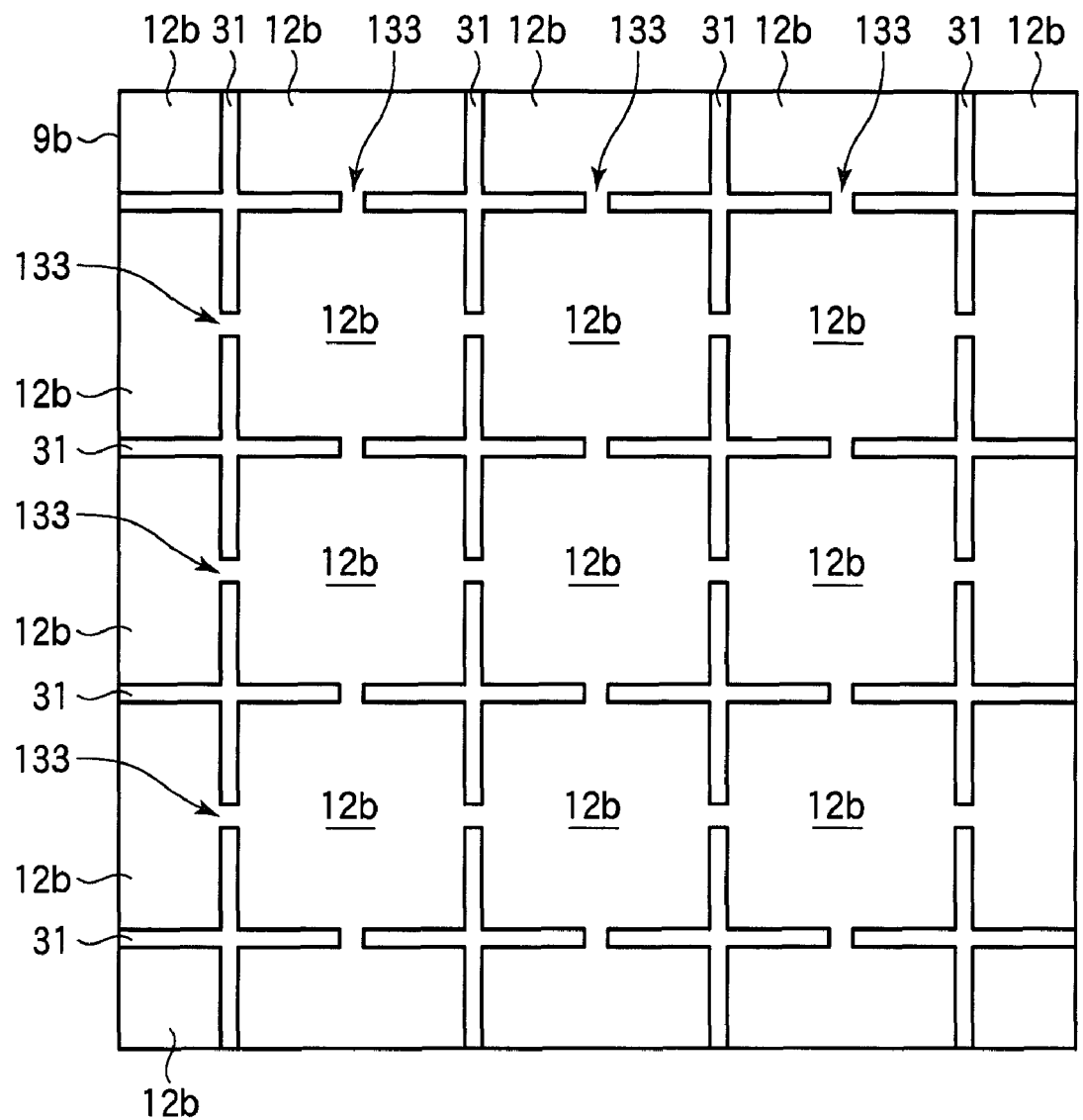
FIG. 8 is an illustration depicting a manufacturing step of the liquid crystal display element 1 according to the embodiment of the invention.

Next, depicted as FIG. 8, wall structures 31 and opening sections 133 are formed between pairs of pixel regions adjacent to each other on one of the PC film substrates (the bottom substrate) 9*b* using a photolithographic process. More specifically, an acrylic photosensitive resin (photo-resist) is applied to one of the PC substrates (the bottom substrate 9*b*). Then, the acrylic photosensitive resin is exposed and developed to form the wall structures 31 and the opening sections 133 between the pixel regions 12b as depicted in FIG. 8. At this stage, the wall structures 31 (acrylic photosensitive resin) is not post-baked. yet. The wall structures 31 are preferably formed from a material which is exhibits adhesive properties when the two PC film substrates (the top and bottom substrates) 7b and 9b are combined.

An opening section 133 is formed near the center of each of four sides of a B pixel region 12b. One B pixel region 12b is contiguous to four opening sections 133. An opening section 133 connects liquid crystal layers of each pair of B pixel regions 12b adjacent to each other. The opening sections 133 are formed to inject a liquid crystal in the B pixel regions 12b.

A polyimide type alignment film material is applied to the other PC film substrate (the top substrate 7b) to a thickness of about 700 Å using a spin coat process. Then, the PC film substrate (the top substrate) 7b coated with the alignment film material is baked for one hour in an oven at a temperature of 90° C. to form an alignment film thereon. An alignment film may be formed on both of the substrates 7b and 9b. Next, an epoxy type seal material 21b is applied to the periphery of one of the PC substrate (the bottom substrate) 9b using a dispenser. The seal material 21b has an injection hole for injecting the liquid crystal.

Then, spacers (manufactured by SEKISUI FINE CHEMICAL) having a diameter of 4 μm are dispersed on the other PC film substrate (the top substrate 7b). Next, the two PC film substrates (the top and bottom substrates) 7b and 9b are combined such that the wall structures 31 are put in contact with both of the two PC film substrates (the top and bottom substrates) 7b and 9b. The substrates 7b and 9b thus combined are heated for one hour at a temperature of 160° C. to cure the seal material 21b and the wall structures 31. Depending on the material from which the wall structures 31 are formed, the wall structures 31 can be provided with adhesive properties by performing post-baking of the wall structures 31 after the substrates 7b and 9b are combined. Thus, the seal material 21b and the wall structures 31 are bonded to the substrates 7b and 9b.

Figure 9A:
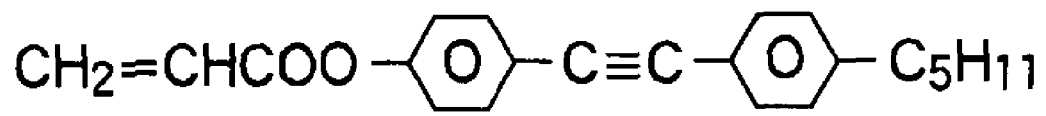
FIGS. 9A and 9B depicts the structural formulae of monofunctional acrylic monomers mixed in the cholesteric liquid crystal.
Figure 9B:
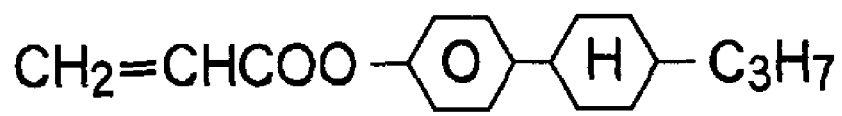

Next, two types of monofunctional acrylic monomers (one of which is, for example, UV-curable liquid crystal UCL-001 manufactured by DIC Corporation) as depicted in FIGS. 9A and 9B are mixed with the B cholesteric liquid crystal. FIGS. 9A and 9B depict the structural formulae of the respective monofunctional acrylic monomers (hereinafter simply referred to as "monomers") mixed in the cholesteric liquid crystal. The two types of monomers depicted in FIGS. 9A and 9B have a rigid and straight rod-like structure similar to the structure of liquid crystal molecules. The monomers exhibit liquid-crystalline properties at room temperature (25° C.) and have high compatibility with the cholesteric liquid crystal. Hence, the two types of monomers are mixed with the cholesteric liquid crystal in units of molecules. Therefore, a homogeneous mixed liquid can be obtained. The mixed liquid also exhibits liquid-crystalline properties at room temperature (25° C.). The two types of monomers are materials different from both of the liquid crystal and the wall structures 31. Depicted as FIGS. 9A and 9B, both of the two types of monomers have a double bond. Both of the two types of monomers have photo-curing properties. The monomers are added to a content of 3 to 20 percent by weight.

Figure 10A:
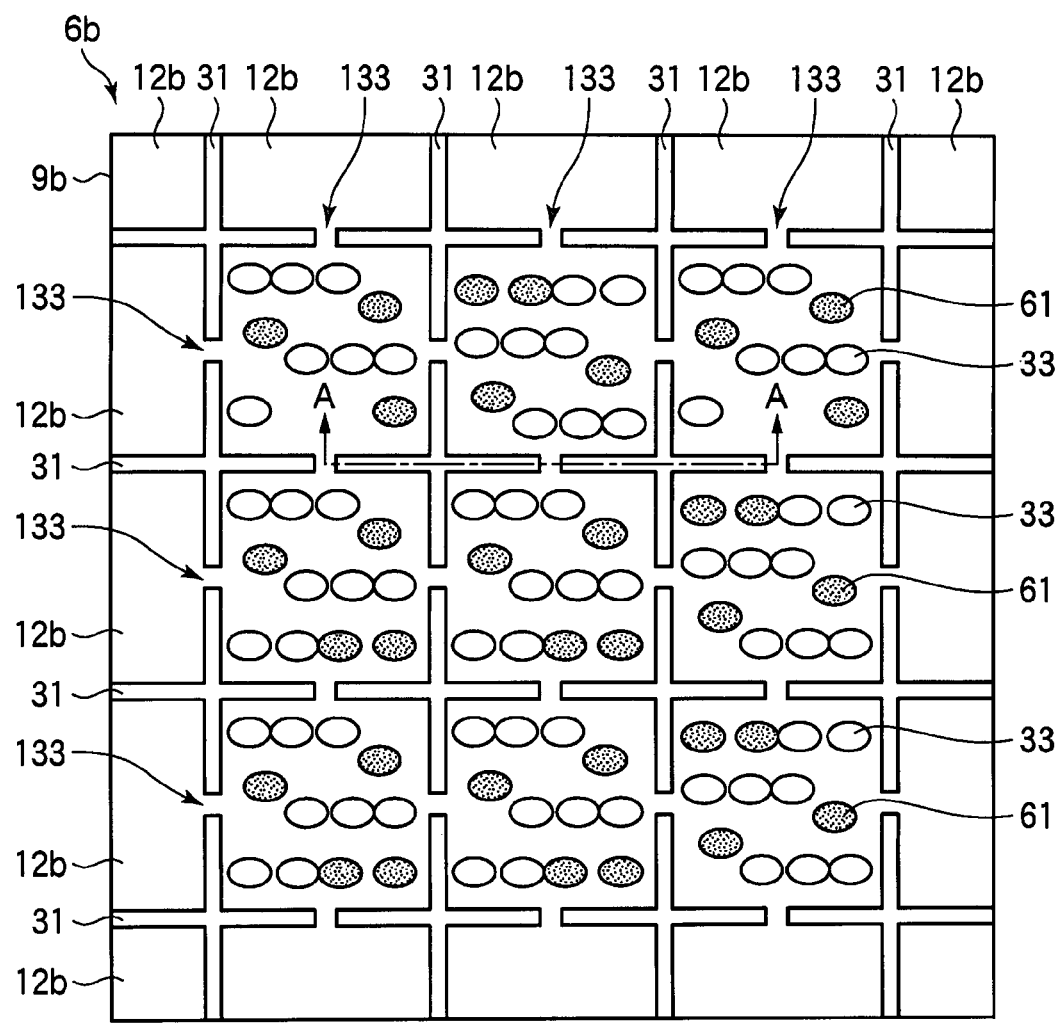
FIGS. 10A and 10B are illustrations depicting another manufacturing step of the liquid crystal display element 1 according to the embodiment of the invention.
Figure 10B:
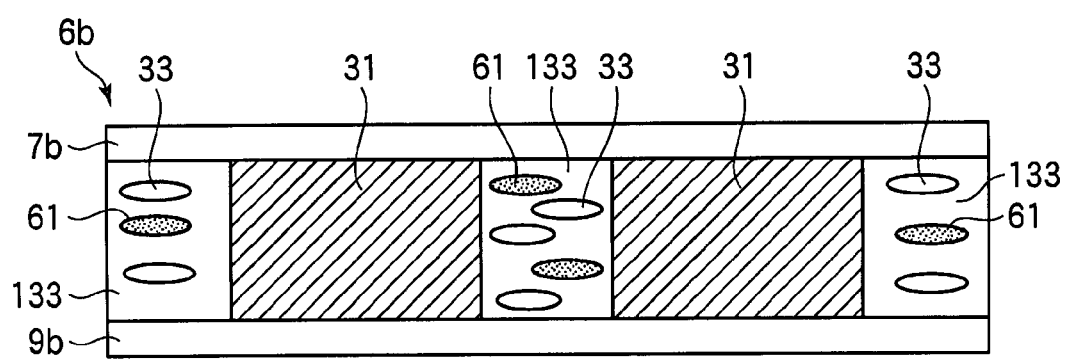
Figure 11A:
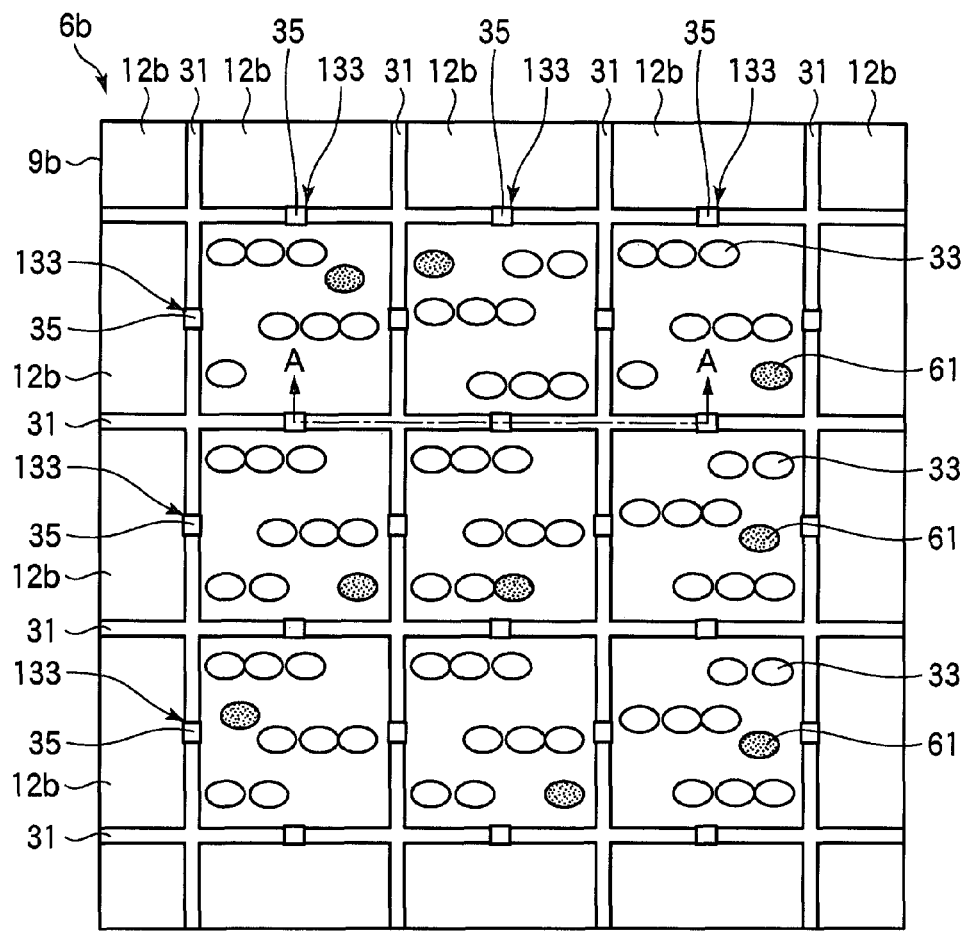
FIGS. 11A and 11B are illustrations depicting another manufacturing step of the liquid crystal display element 1 according to the embodiment of the invention.
Figure 11B:
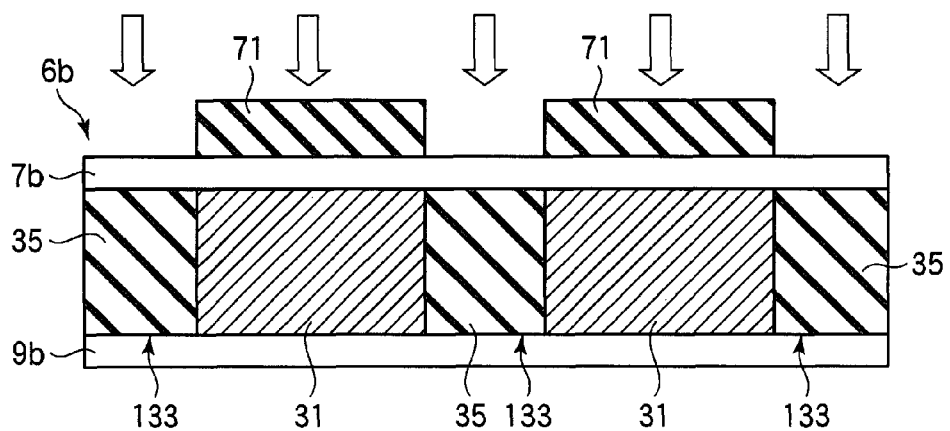
Figure 12A:
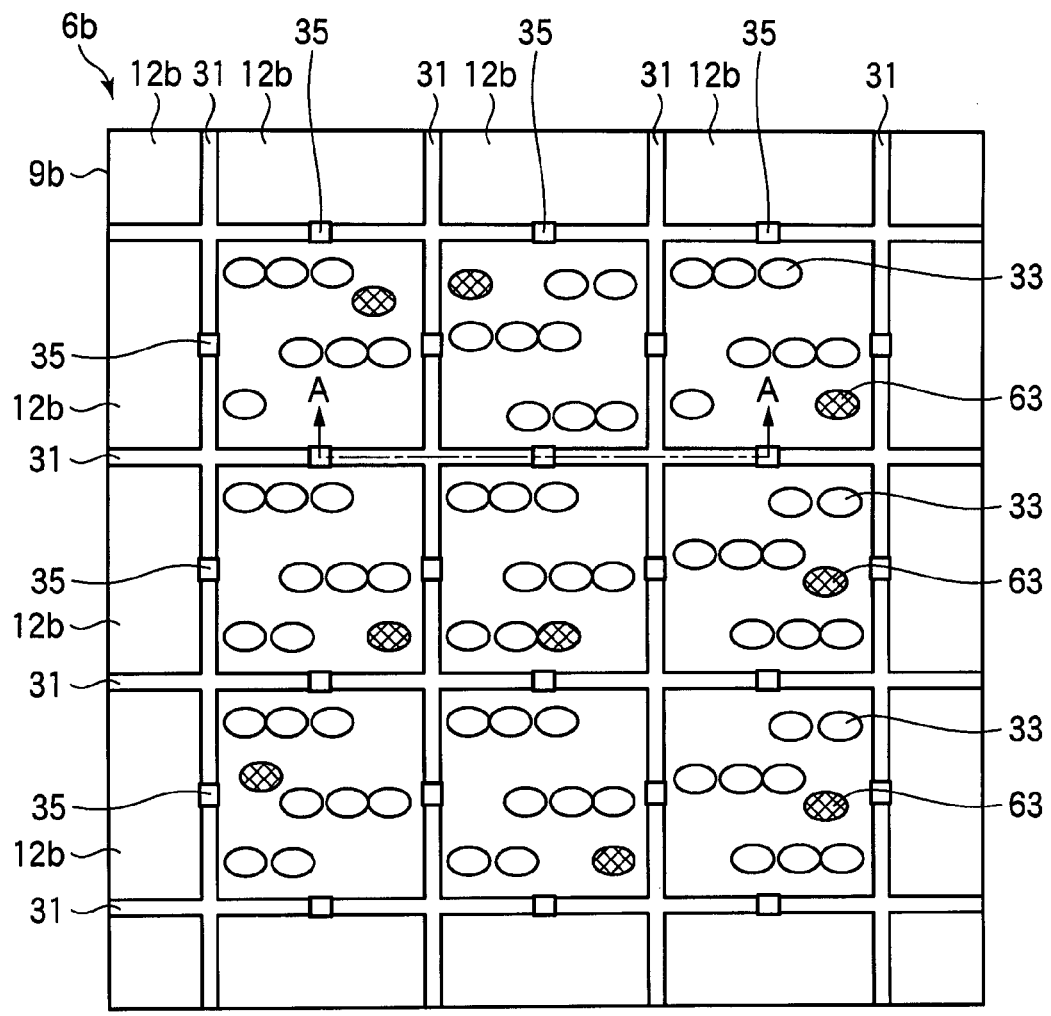
FIGS. 12A and 12B are illustrations depicting another manufacturing step of the liquid crystal display element 1 according to the embodiment of the invention.
Figure 12B:
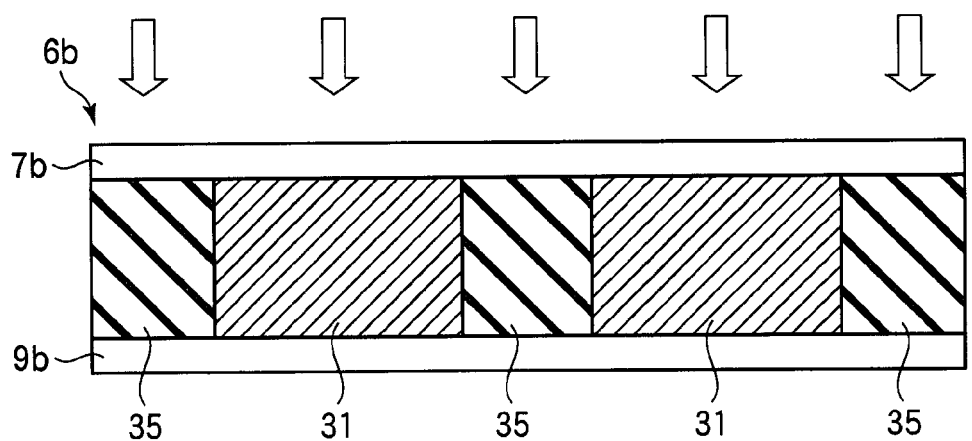
Figure 13:
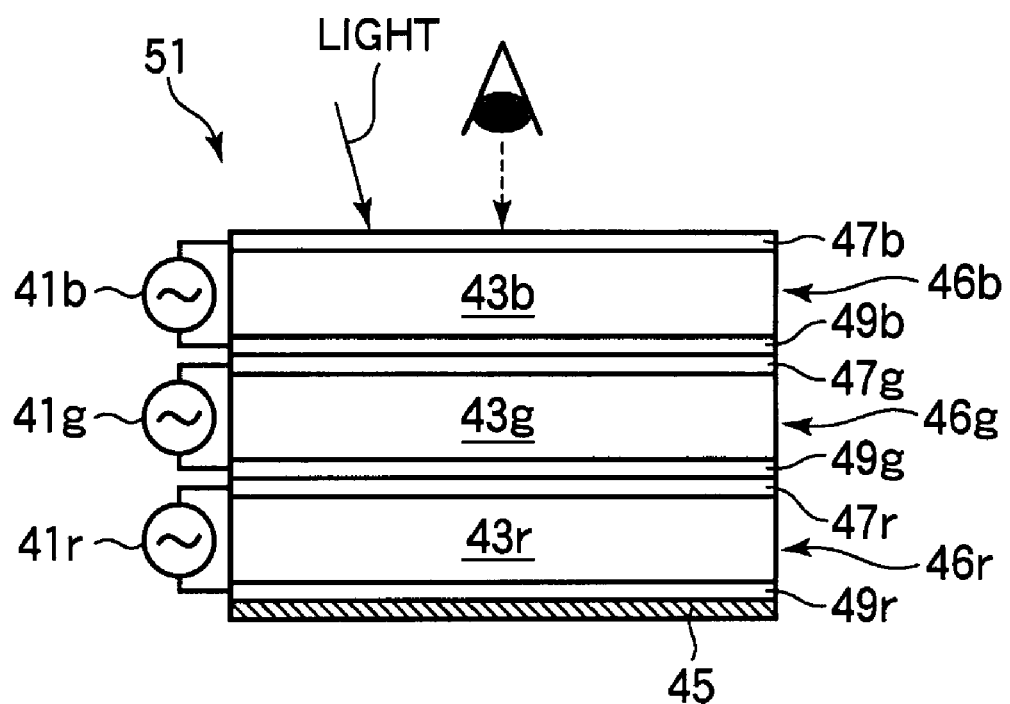
FIG. 13 is an illustration schematically depicting a sectional configuration of a liquid crystal display element capable of color display according to the related art.
Figure 14A:
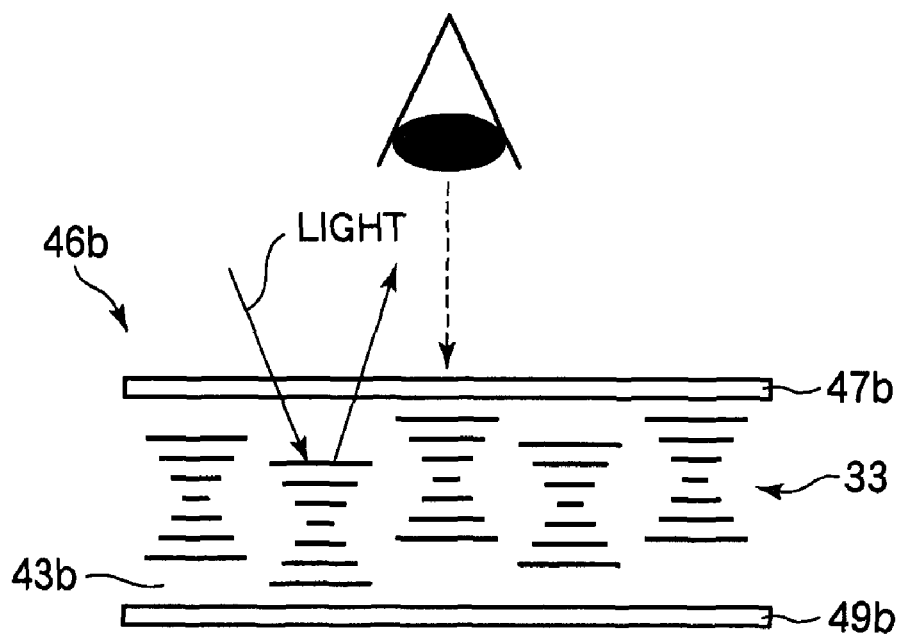
FIGS. 14A and 14B are illustrations schematically depicting sectional configurations of a liquid crystal layer of a liquid crystal display element according to the related art.
Figure 14B:
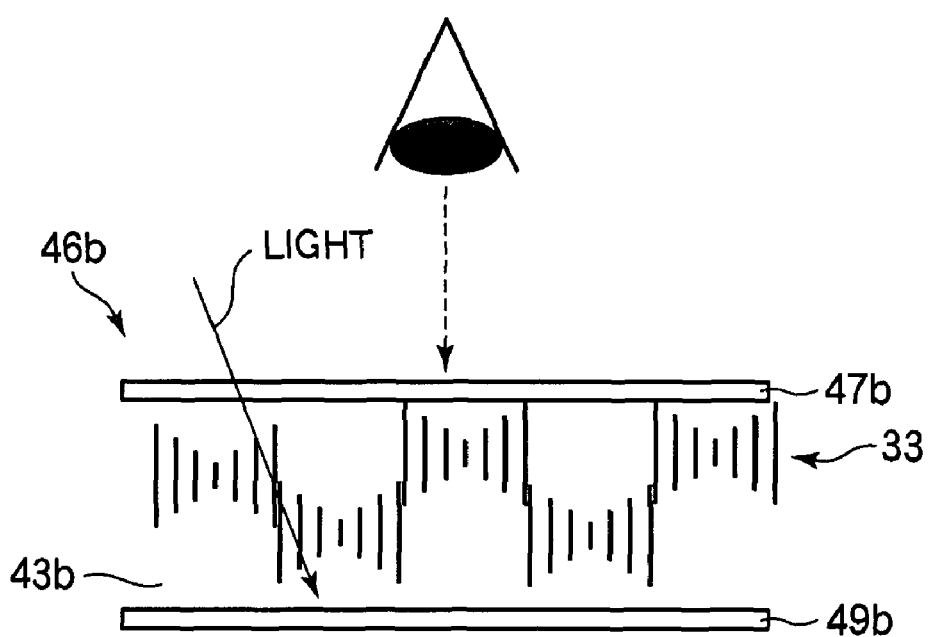

FIGS. 1A, 1A, and 12A are illustrations depicting steps of manufacturing the liquid crystal display element 1, and the figures depict a configuration of a part of the B display portion 6b viewed in the normal direction of the substrate surfaces. FIGS. 10B, 11B, and 12B are sectional views taken along the lines A-A in FIGS. 10A, 11A, and 12A. The liquid obtained by mixing the liquid crystal and the two types of monomers is injected into the gap between the pair of substrates, i.e., the top substrate 7b and the bottom substrate 9b through the injection hole using a vacuum injection process. Depicted as FIG. 10A, all B pixel regions 12b are filled with the liquid crystal 33 and the two types of monomers 61 thus injected through the opening sections 133. As thus described, the opening sections 133 serve as channels allowing the liquid crystal 33 and the monomers 61 to flow to fill all B pixel regions 12b with the liquid crystal and the monomers 61. Depicted as FIG. 10B, the opening sections 133 are also filled with the liquid crystal 33 and the monomers 61. In FIGS. 10A and 10B, the liquid crystal 33 and the monomers 61 are schematically represented by ellipses. The injection hole is then sealed with an epoxy type sealant.

According to the method of manufacturing the liquid crystal display element 1 of the present embodiment, the liquid crystal 33 and the monomers 61 can be injected using a vacuum injection process because the opening sections 133 are formed so as to connect the liquid crystal layers of B liquid crystal regions 12b adjacent to each other. The mixture of the liquid crystal 33 and the monomers 61 also exhibits liquid-crystalline properties at room temperature (25° C.) just like the liquid crystal alone. Thus, the liquid crystal 33 and the monomers 61 can be easily injected into the gap between the substrates 7b and 9b.

Next, depicted as FIG. 11B, the opening sections 133 are exposed to ultraviolet light (having a center wavelength of 365 nm) using, for example, a photo-mask 71 which blocks the B pixel regions 12b and the wall structures 31 from the light. Referring to the amount of the ultraviolet light for exposure, for example, the illumination intensity is 2 mW/cm$^2$ at the center wavelength of 365 nm, and the duration of the illumination is 4 minutes. Alternatively, the wall structures 31 and the opening sections 133 may be exposed using a photo-mask blocking the B pixel regions 12b from the light.

The liquid crystal 33 and the two types of monomers 61 drift between the top substrate 7b and the bottom substrate 9b due to thermal fluctuations of the liquid crystal 33. When the opening sections 133 is irradiated with the ultraviolet light, the two types of monomers 61 having a double bond are polymerized at the openings 133, whereby a polymer is chemically synthesized. Depicted as FIGS. 11A and 11B, the polymer having an increased molecular weight is deposited and cured at the opening sections 133 in the form of a fibrous network. Thus, polymer layers 35 are formed at the opening sections 133. Since the polymer layers 35 are formed, each B pixel regions 12b is surrounded by the wall structures 31 and the polymer layers 35 without discontinuity. Depicted as FIG. 11A, some of the monomers 61 may remain in the B pixel regions 12b without being polymerized.

Next, the B display portion 6b (including the B pixel regions 12b) is entirely exposed as depicted in FIG. 12B. As a result, polymerization occurs between the two types of monomers 61 remaining in the B pixel regions 12b which have not been exposed, whereby a polymer 63 is formed in the B pixel regions 12b. The full exposure step may be performed as occasion demands. Through the above-described steps, the fabrication of the B display portion 6b is completed. The G display portion 6g and the R display portion 6r are fabricated using the same method.

Next, depicted as FIG. 3, the B, G, and R display portions 6b, 6g, and 6r are formed one over another in the order listed from the side of the element where a display surface is provided. Next, a visible light absorbing layer 15 is disposed on a bottom surface of the bottom substrate 9r of the R display portion 6r. Then, general-purpose STN driver ICs with the TCP structure are crimped to terminal parts of scanning electrodes 17 and data electrodes 19 of the B, G, and R display portions 6b, 6g, and 6r stacked one over another, and a power supply circuit and a control circuit 23 are further connected. Thus, a liquid crystal display element 1 capable of QVGA display is completed. Although not depicted, electronic paper is completed by providing the liquid crystal display element 1 thus completed with an input/output device and a control device for exercising overall control of the element (neither of which is depicted).

According to the method of manufacturing the liquid crystal display element 1 of the present embodiment, prior to the injection of the liquid crystals, the wall structures 31 surrounding a major part of the peripheries of the pixel regions 12 and the opening sections 133 for injecting the liquid crystals in the liquid crystal display element are formed. Therefore, according to the method of manufacturing liquid crystal display element 1 of the present embodiment, the liquid crystals can be easily injected using a vacuum injection process. The wall structures 31 improve the rigidity of the liquid crystal display element 1 and allow the movement of the liquid crystals. According to the method of manufacturing the liquid crystal display element 1 of the present embodiment, the polymer layers 35 are formed at the opening sections 133 after the liquid crystals are injected. It is therefore possible to achieve a higher degree of suppression of the movement of the liquid crystals in the pixel regions 12b, 12g, and 12r. The wall structures 31 improve the resistance of the liquid crystal display element 1 to an external force attributable to a press or bend applied to the display surface which can result in a change in a state of display (loss of memory characteristics). Such resistance is further improved by forming the polymer layers 35 at the opening sections 133. In the liquid crystal display element 1, a high resistance to an external force attributable to a press or bend applied to the display surface can be achieved to suppress a change in a state of display while achieving ease of liquid crystal injection.

The monomers used in the method of manufacturing the liquid crystal display element 1 of the present embodiment are substances having photo-curing properties. The monomers can therefore be injected into the liquid crystal display element along with the liquid crystals, and the monomers can be cured at the opening sections 133 by performing masked exposure after the liquid crystals and the monomers are injected.

Alternatively, the polymer layers 35 may be formed throughout the gaps between the pixel regions 12b, 12g, and 12r of the liquid crystal display element 1 without forming the wall structures 31. Since the polymer layers 35 are formed throughout the gaps between the pixel regions 12b, 12g, and 12r to surround the pixel regions 12b, 12g, and 12r without any discontinuity, the suppression of a change in a state of display can be achieved also when the liquid crystal display element 1 is thus configured. However, in order to form the polymer layers 35 so as to surround the pixel regions 12b, 12g, and 12r without any discontinuity, a greater amount of monomers be mixed in the liquid crystals when compared to the amount mixed when the wall structures 31 are formed. Thus, the monomer content is increased. As a result, a problem arises in that the liquid crystal display element requires a higher liquid crystal driving voltage. Further, since the wall structures 31 are not formed, a problem arises in that the liquid crystal display element has lower rigidity and in that it is difficult to keep the cell gap of the liquid crystal display element uniform.

EXAMPLE

The resistance of the liquid crystal display element 1 to a press and bend was examined. No change was observed in a memorized state of display of the liquid crystal display element 1 when it was bent to a radius of curvature R of 30 mm. No change was observed in a memorized state of display of the liquid crystal display element 1 when it was pressed with a force of 6 kg/cm$^2$.

As thus described, the liquid crystal display element 1 exhibits high resistance to an external force attributable to a press or bend. The high resistance of the liquid crystal display element 1 to an external force is attributable to the suppression of the movement of the liquid crystals achieved by closing the opening sections 133 with the polymer layers 35, high resistance of the wall structures 31 to compression, and the suppression of a change in the cell gap achieved by bonding the wall structures 31 to both of the top and bottom substrates.

COMPARATIVE EXAMPLE

A liquid crystal display element was fabricated according to a manufacturing method that is the same as the method for the liquid crystal display element 1 except that the monofunctional acryl monomers, which are photo-curing substances, are not mixed in the cholesteric liquid crystals and that the steps for curing the photo-curing substances (the steps depicted in FIGS. 11a to 12b) are therefore omitted. The resistance of the liquid crystal display element to a press and bend was examined. Although no change was observed in a memorized state of display of the liquid crystal display element when it was bent to a radius of curvature R of 60 mm, a disturbance to the state of display was observed when the bend was increased. The liquid crystal display element had a withstand pressure of 2 kg/cm$^2$. A withstand pressure of a liquid crystal display element is the maximum pressing force that the liquid crystal display element can withstand without a change in a state of display thereof when a display surface of the liquid crystal display element is pressed by a finger of a person.

As described above, the present embodiment makes it possible to provide a liquid crystal display element 1 utilizing cholesteric liquid crystals, whose liquid crystals can be easily injected and in which a change in a state of display attributable to an external force resulting from a press of bend can be suppressed. On electronic paper utilizing a liquid crystal display element 1 according to the present embodiment, color display having high brightness can be achieved while suppressing a change in a state of display attributable to an external force resulting from a press or bend.

The invention is not limited to the above-described embodiment and may be modified in various ways.

Although a passive matrix (simple matrix) liquid crystal display element has been described above as an exemplary embodiment of the invention, the invention is not limited to such an element. The invention may be applied to active matrix liquid crystal display elements having a switching device such as a thin film transistor (TFT) or thin film diode (TFD) at each pixel.

Although a liquid crystal display element utilizing cholesteric liquid crystals has been described above as an exemplary embodiment of the invention, the invention is not limited to such an element. The invention may be applied to liquid crystal display elements utilizing other types of liquid crystals having the property of memorizing a state of display.

The above embodiment has been described as a liquid crystal display element having a three-layer structure formed by stacking B, G, and R display portions 6b, 6g, and 6r one over another as an example. However, the invention is not limited to such an element and may be applied to liquid crystal display elements having a structure with two layers or four or more layers.

The above embodiment has been described as a liquid crystal display element including display portions 6b, 6g, and 6r having liquid crystal layers 3b, 3g, and 3r for reflecting blue, green, and red rays of light in the planar state, as an example. However, the invention is not limited to such an element and may be applied to liquid crystal display elements including three display portions having liquid crystal layers for reflecting cyan, magenta, and yellow rays of light in the planar state.

In the above embodiment, the wall structures 31 are not formed in the pixel regions 12b, 12g, and 12r. The invention is not limited to such a configuration, and a plurality of the wall structures may alternatively be formed inside the pixel regions, e.g., in central parts of the pixel regions. It is not essential to form the wall structures 31 such that they are located completely outside the pixel regions 12b, 12g, and 12r, and the wall structures may overlap the peripheries of the pixel regions. In order to improve the rigidity of the wall structures 31 and to provide them with stable adhesive properties, the wall structures 31 may be formed inside the pixel regions 12b, 12g, and 12r at peripheral parts of the regions.

The material of the polymer layers 35 is not limited to the two types of monomers depicted in FIGS. 9A and 9B, and other monomers or oligomers having photo-curing properties may alternatively be used.

The invention is not limited to the described method of providing the wall structures 31 with adhesive properties, in which the post baking of the wall structures 31 is performed after combining the bottom substrate having the wall structures 31 formed thereon with the top substrate. Depending on the material from which the wall structures 31 are formed, the wall structures 31 may be provided with adhesive properties by combining the bottom and top substrates after performing post baking of the wall structures 31.

The wall structures 31 are not limited to the shape substantially in the form of two cross bars which are substantially equal in length. What is required is that the pixel regions 12b, 12g, and 12r are surrounded by the wall structures 31 and the polymer layers 35 without any discontinuity. For example, the wall structures 31 may have a shape which is substantially in the form of two cross bars having different lengths.

Referring to the number of the opening sections 133 (and the polymer layers 35), the invention is not limited to the mode of implementation in which those sections are provided at four locations per pixel region 12b, 12g, or 12g. What is required is that the opening sections 133 (and the polymer layers 35) are formed to allow the liquid crystals to be injected into all pixel regions 12b, 12g, and 12r. The opening sections 133 (and the polymer layers 35) may alternatively be formed at two, three, or five or more locations per pixel region 12b, 12g, or 12r. The formation of the opening sections 133 (and the polymer layers 35) is not limited to the position near the center of each of four sides of each pixel region 12b, 12g, or 12r.

What is claimed is:

1. A liquid crystal display element comprising:
a pair of substrates disposed opposite to each other;
a liquid crystal sealed between the pair of substrates;
a wall structure formed in contact with both of the pair of substrates;
an opening section connecting regions surrounded by the wall structure; and
a polymer layer formed at the opening section by polymerizing polymeric substances which are materials different from both of the liquid crystal and the wall structure.

2. The liquid crystal display element according to claim 1, wherein the polymeric substances have photo-curing properties.

3. The liquid crystal display element according to claim 2, wherein the polymeric substances exhibit liquid-crystalline properties at room temperature (25° C.).

4. The liquid crystal display element according to claim 1, wherein the wall structure is bonded to both of the pair of substrates.

5. The liquid crystal display element according to claim 1, wherein the wall structure and the polymer layer form a structure having no discontinuity.

6. The liquid crystal display element according to claim 1, wherein the liquid crystal is a cholesteric liquid crystal.

7. The liquid crystal display element, comprising:
three layers formed one over another as first to third display portions each including a liquid crystal display element according to claim 1,
wherein the liquid crystals in the first to third display portions exhibit a light-reflecting state, a light-transmitting state, or an intermediate state between the light-reflecting and light-transmitting states, and
each of the liquid crystals in the first to third display portions reflects any of blue, green and red rays of light.

8. The liquid crystal display element according to claim 7, wherein:
the liquid crystal in the first display portion reflects the blue rays of light;
the liquid crystal in the second display portion reflects the green rays of light;
the liquid crystal in the third display portion reflects the red rays of light; and
the first, second, and third display portions are formed one over another in the order listed from the side of the element where a display surface is provided.

9. The liquid crystal display element according to claim 8, wherein the optical rotatory power of the liquid crystal in the second display portion is different from the optical rotatory power of the liquid crystals in the first and third display portions.

10. The liquid crystal display element according to claim 8, further comprising a light absorbing layer disposed at a lowermost part on the side of the element opposite to the display surface side.

11. Electronic paper displaying an image, comprising a liquid crystal display element according to claim 1.

* * * * *